(12) United States Patent
Watanabe et al.

(10) Patent No.: US 7,809,804 B2
(45) Date of Patent: Oct. 5, 2010

(54) IMAGE PROCESSING APPARATUS AND PROGRAM PRODUCT

(75) Inventors: Satoshi Watanabe, Kasugai (JP); Kazuma Aoki, Kasugai (JP); Kiyotaka Ohara, Nagoya (JP); Makoto Matsuda, North Brunswick, NJ (US)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1070 days.

(21) Appl. No.: 11/513,146

(22) Filed: Aug. 31, 2006

(65) Prior Publication Data
US 2007/0047844 A1 Mar. 1, 2007

(30) Foreign Application Priority Data
Aug. 31, 2005 (JP) ............................. 2005-251783

(51) Int. Cl.
*G06F 15/16* (2006.01)
*G06K 9/00* (2006.01)
(52) U.S. Cl. ...................................... 709/218; 382/312
(58) Field of Classification Search ................. 709/203, 709/218, 219; 235/375; 382/312
See application file for complete search history.

(56) References Cited

U.S. PATENT DOCUMENTS

| | | | | |
|---|---|---|---|---|
| 5,869,819 A * | 2/1999 | Knowles et al. | ............. | 235/375 |
| 6,088,707 A * | 7/2000 | Bates et al. | ............. | 715/235 |
| 6,484,149 B1 * | 11/2002 | Jammes et al. | ............. | 705/26 |
| 6,901,438 B1 * | 5/2005 | Davis et al. | ............. | 709/219 |
| 7,188,307 B2 * | 3/2007 | Ohsawa | ............. | 715/205 |
| 7,257,768 B2 * | 8/2007 | Horikiri et al. | ............. | 715/229 |
| 2002/0083123 A1 * | 6/2002 | Freedman et al. | ............. | 709/203 |
| 2002/0112000 A1 * | 8/2002 | Itoh | ............. | 709/203 |
| 2003/0229854 A1 * | 12/2003 | Lemay | ............. | 715/513 |
| 2006/0215911 A1 * | 9/2006 | Ashikaga et al. | ............. | 382/190 |

FOREIGN PATENT DOCUMENTS

| | | |
|---|---|---|
| JP | 2002222213 | 8/2002 |
| JP | 2002344678 | 11/2002 |

* cited by examiner

*Primary Examiner*—Saleh Najjar
*Assistant Examiner*—Vitali Korobov
(74) *Attorney, Agent, or Firm*—Banner & Witcoff, Ltd.

(57) ABSTRACT

An image processing apparatus transmits data via a network to a server equipped with a function for distributing an image received from a terminal apparatus over the network to another terminal apparatus over the network and a function for transmitting a track back notification with respect to a track back destination address. The image processing apparatus includes an image reading unit capable of reading an image from an original, a determining unit that determines a track back address that is used in correspondence with the image read by the image reading unit, and a data transmitting unit that transmits both image data indicative of the image read by the image reading unit, and address data indicative of the track back destination address determined by the determining unit to the server.

13 Claims, 20 Drawing Sheets

FIG. 2A

```
<DATA type = APPLICATION SETTING>
 <SET>
  <USER ID>3</USER ID>
  <SERVER URL>http://(blog SERVER ADDRESS URL)/</SERVER URL>
 </SET>
</DATA>
```

FIG. 2B

```
<DATA type = PRINTED ARTICLE>
 <PRINTED ARTICLE name = USER ID>
  <ARTICLE>
        <URL>(TRACK BACK URL 1)</URL>
        <TIME>2005/07/02 19:26:11</TIME>
  </ARTICLE>
  <ARTICLE>
        <URL>(TRACK BACK URL 2)</URL>
        <TIME>2005/08/01 05:13:21</TIME>
  </ARTICLE>
  <ARTICLE>
        <URL>(TRACK BACK URL 3)</URL>
        <TIME>2005/08/02 09:03:00</TIME>
  </ARTICLE>
 </PRINTED ARTICLE>
</DATA>
```

FIG. 3A

```
<DATA type = blog SETTING>
 <SET name = USER ID>
  <BASE DIRECTORY>http://(blog SERVER ADDRESS URL)/(USER
DIRECTORY NAME)/</BASE DIRECTORY>
  <PROGRAM>(blog PROGRAM NAME)</PROGRAM>
  <Page>7</Page>
 </SET>
</DATA>
```

FIG. 3B

```
<DATA type = REGISTERED ARTICLE>
 <REGISTERED ARTICLE name = USER ID>
  <ARTICLE>
        <URL>http://blog SERVER ADDRESS URL)/(USER DIRECTORY
NAME)/4</URL>
        <TIME>2005/08/02 09:03:00</TIME>
  </ARTICLE>
  <ARTICLE>
        <URL>http://(blog SERVER ADDRESS URL)/(USER DIRECTORY
NAME)/2</URL>
        <TIME>2005/08/01 05:13:21</TIME>
  </ARTICLE>
  <ARTICLE>
        <URL>http://(blog SERVER ADDRESS URL)/(USER DIRECTORY
NAME)/1</URL>
        <TIME>2005/07/02 19:26:11</TIME>
  </ARTICLE>
 </REGISTERED ARTICLE>
</DATA>
```

*FIG. 4*

```
<DATA type = TRACK BACK LIST>
 <TRACK BACK LIST>
  <TRACK BACK>
        <URL>(TRACK BACK URL 1)</URL>
        <REGISTERED TIME>2005/10:12 22:26:11</REGISTERED TIME>
  </TRACK BACK>
  <TRACK BACK>
        <URL>(TRACK BACK URL 2)</URL>
        <REGISTERED TIME>2005/09/07 19:22:09</REGISTERED TIME>
  </TRACK BACK>
  <TRACK BACK>
        <URL>(TRACK BACK URL 3)</URL>
        <REGISTERED TIME>2005/07/02 11:36:21</REGISTERED TIME>
  </TRACK BACK>
 </TRACK BACK LIST>
</DATA>
```

IMAGE PROCESSING APPARATUS AND PROGRAM PRODUCT

CROSS REFERENCE TO RELATED APPLICATION

This application claims priority from Japanese Patent Application No. 2005-251783, filed on Aug. 31, 2005, the entire subject matter of which is incorporated herein by reference.

TECHNICAL FIELD

Aspects of the present invention relate to an image processing apparatus and a program product.

BACKGROUND

Conventionally, image processing apparatus are known in the technical field, which are equipped with functions (namely, function called as "Scan to FTP") capable of transmitting images read out from originals in image scanner units via networks to servers (refer to, for instance, JP-A-2002-344678, paragraph [0002]).

An image processing apparatus having such a function can directly transmit images from the own image processing apparatus to a server on a network. As a result, when the images are transmitted to the server, the image transmitting operation to the server can be carried out by solely employing the image processing apparatus even if the images are not once transferred from the image processing apparatus to another terminal apparatus (for instance, personal computer).

On the other hand, very recently, such Web pages corresponding to a track back function are increased among Web pages opened on the Internet. This track back function implies such a function which is prepared in order that a hyper link to a certain Web page "a" is registered (reverse-linked) into another Web page "b." For instance, among Web pages and the like which have modes called as "blog (namely, abbreviated from "Weblog"), there are many cases which employ this track back function.

An idea of this track back function will now be explained by exemplifying such a case that the own Web page "a" (blog "a") is present on a blog server "A", and a Web page "b" (blog "b") of another person is present in another blog server "B."

In the case of this example, for instance, a manager of the Web page "a" edits an article "a1" described on the own Web page "a" on a personal computer (will be referred to as "PC" hereinafter), and then, accesses the blog server "A" from this PC via a network, so that the article "a1" can be uploaded to the blog server A.

At this time, when the manager of the Web page "a" wants to register the hyper link to the article "a1" described in the Web page "a" into the Web page "b" of another person (otherwise, article "b1" described in Web page "b"), the manager of the Web page "a" transmits from the PC to the blog server A, such an information which is required for performing a track back notification from the blog server "A" to the blog server "B." In this case, an address which constitutes a transmission source of the track back notification (will be referred to as "track back destination address" hereinafter), and the like are contained in the information which is required to perform the track back notification to be transmitted.

This track back destination address is also referred to as a "track back URL" (symbol "URL" indicates Uniform Resource Locator). It should be understood that for the sake of clearly discriminating a URL of a track back source from a URL of a track back destination, such technical terms as a track back destination address, or a track back destination URL, and a track back source address, or a track back source URL will be employed, but a technical term of "track back URL" is not used.

Normally, in the case that the article "b1" described in the Web page "b" is made in correspondence with the track back function, a track back destination address corresponding to this article b1 is described in any place within the Web page "b." As a consequence, the manager of the Web page "a" can grasp the track back destination address descried in the Web page "b" by referring to the Web page "b", and can transmit this track back destination address from the PC to the blog server "A."

When the article "a1" is uploaded from the PC, the blog server "A" saves the uploaded article "a1" in a file. Thereafter, in the case that a request for viewing the Web page "a" is issued from a terminal apparatus on the network, the Web page "a" containing the article "a1" can be distributed with respect to the terminal apparatus which becomes the request source due to the Web page distribution function provided by the blog server "A." Also, when the article "a1" was uploaded from the PC, if the track back destination address has been received in combination with the article "a1", then the blog server "A" transmits a track back notification with respect to the track back destination address due to the track back notification transmission function provided in the blog server "A." While this track back notification is also called as a "track back ping", such an information related to a track back source (in this case, article "a1" contained in Web page "a") has been contained in the track back notification.

On the other hand, while the blog server "B" is equipped with a track back notification reception function, such a track back notification which is transmitted by the blog server "A" to the track back destination address is received by the blog server "B." Upon reception of the track back notification, the blog server "B" registers a hyperlink to the article "a1" contained in the Web page "a" into such a Web page "b" (otherwise, article "b1" contained in Web page "b") corresponding to the track back destination address. Subsequently, in the case that a request for viewing the Web page "b" is issued from a terminal apparatus on the network, the blog server "B" can distribute the Web page "b" containing the hyper link to the article "a1" contained in the Web page "a" with respect to the terminal apparatus which constitutes the request source due to a Web page distribution function provided in the blog server "B."

SUMMARY

Aspects of the present invention provide an image processing apparatus and a program product, which can transmit an image read by using an image reading unit to a server on a network, and furthermore, can transmit to the server on the network, such an information which is required when a track back notification in which the image transmitted to the server is defined as a track back source is transmitted from the server to a track back destination address.

BRIEF DESCRIPTION OF THE DRAWINGS

FIGS. 2A and 2B are explanatory diagrams for exemplifying data structures as to application setting data and a printed article database;

FIGS. 3A and 3B are explanatory diagrams for exemplifying data structures as to set data and registered article database;

FIG. 4 is an explanatory diagram for exemplifying a data structure of a track back list;

DETAILED DESCRIPTION

General Overview

Figure 1:
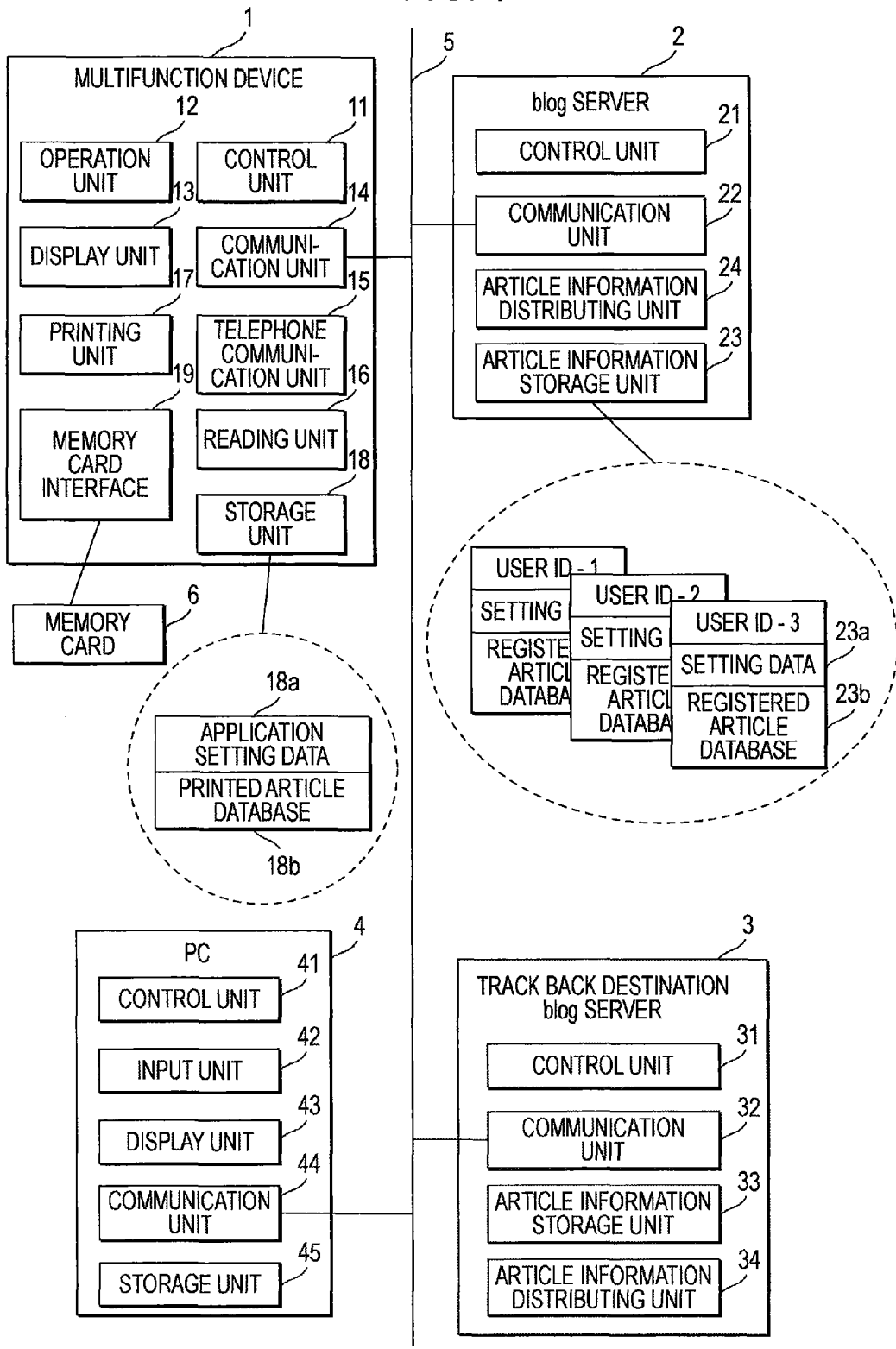
FIG. 1 is a block diagram for indicating an entire arrangement of an image processing system according to an exemplary aspect of the present invention.

An image processing apparatus, according to an aspect of the present invention, is configured such that various sorts of data can be transmitted via a network to a server that is equipped with a function for distributing an image received from a terminal apparatus over the network to another terminal apparatus over the network and a function for transmitting a track back notification with respect to a track back destination address, the image processing apparatus comprising: an image reading unit capable of reading an image from an original; a determining unit that determines a track back address that is used in correspondence with the image read by the image reading unit; and a data transmitting unit that transmits both image data indicative of the image read by the image reading unit, and address data indicative of the track back destination address determined by the determining unit to the server.

In accordance with the image processing apparatus with employment of the above-explained arrangement, in combination with the image read by the image reading unit, the address data can also be transmitted to the server, and this address data indicates the track back destination address which is used in correspondence with this image.

As a consequence, different from the image processing apparatus for transmitting to the server, only such an image read by the image reading unit, since the process operation is solely performed by the image processing apparatus, the track back notification in which the image transmitted to the server is defined as the track back source can be transmitted from the server to the track back destination address. Also, since the terminal apparatus such as the PC is no longer required to be utilized which is separately employed as the image processing apparatus, higher cost for conducting the entire system is not required. Moreover, the image processing apparatus and the terminal apparatus such as the PC are not required to be separately operated, so that the cumbersome operations can also be omitted.

It is preferable to construct the image processing apparatus equipped with the below-mentioned arrangements.

First of all, the above-explained determining unit may be arranged by such a unit which determines the track back destination address which is used in correspondence with the image read by the image reading unit based upon a track back destination address corresponding to a Web page to which either the own appliance or another appliance was accessed in the past.

In this case, the own appliance implies an image processing apparatus itself which constitutes an operation subject, whereas another appliance implies an appliance other than the image processing apparatus which constitutes the operation subject. Also a Web page to which either the own appliance or another appliance is accessed implies, for example, a Web page which is displayed by either the own appliance or another appliance, a Web page which is printed by either the own appliance or another appliance, or such a Web page which has been saved as a file by either the own appliance or another appliance.

The determining unit acquires a track back destination address corresponding to the Web page to which either the own appliance or another appliance was accessed in the past, and determines the track back destination address which is used in correspondence with the image read by the image reading unit based upon the acquired track back destination address.

When either the own appliance or another appliance accesses these Web pages, if the track back destination address corresponding to this Web page has been stored in the storage region within the own appliance, then the determining unit can acquire the track back destination address from the storage region within the own appliance. Also, when either the own appliance or another appliance accesses these Web pages, if the track back destination address corresponding to this Web page has been stored in such a storage region (for example, storage device on network) other than the own appliance, to which the own appliance can access, then the determining unit can acquire the track back destination address from the storage region outside the own appliance.

Then, in such a case that the track back destination address acquired by the determining unit is only one address, the determining unit may merely determine that the acquired track back destination address itself is such a track back destination address which is used in correspondence with the image read by the image reading unit. Alternatively, a portion of the acquired track back destination address may be shaped and the shaped destination address may be processed by deleting unnecessaring information, or by adding necessary information thereto, and thereafter, the processed destination address may be determined as the track back destination address which is used in correspondence with the image read by the image reading unit. Furthermore, in the case that the acquired track back destination addresses are plural destination addresses, one destination address may be selected from these plural destination addresses. Thereafter, the selected destination address may be directly shaped in the above-explained manner, and then the processed destination address may be determined as the track back destination address which is used in correspondence with the image read by the image reading unit. Otherwise, when the acquire track back destination addresses are the plural addresses, two, or more destination addresses may be alternatively selected.

With employment of such an arrangement, the track back destination address may be simply selected from the access history of the Web pages to which either the own appliance or another appliance accessed in the past.

More specifically, the above-explained determining unit may correspond to such a determining unit which reads out a track back destination address corresponding to the Web page to which either the own appliance or another appliance was accessed in the past from a database into which the track back destination address corresponding to the Web page is registered/stored by the appliance which was accessed to the Web page, and determines the track back destination address which is used in correspondence with the image read by the image reading unit based upon the read track back destination address.

With employment of such an arrangement, the access history of the Web pages to which either the own appliance or another appliance accessed in the past can be acquired from the database into which the track back destination address corresponding to the Web page is registered/stored by the appliance which was accessed to the Web page, and then, the track back destination address can be simply selected from the access history. As a consequence, the possibility capable of accessing the track back destination address required by the user can be increased, as compared with that of such an appliance that only one latest access history is continuously stored in the overwriting manner.

Also, although the database may be constructed by employing a storage device on the network, which is provided outside the own appliance, it is preferable to construct the above-described database by utilizing the storage unit provided in the own appliance.

With employment of the above-described arrangement, since the image processing apparatus can access the database by executing only the internal process operation within the own appliance, even in such a case that trouble such as a communication failure happens to occur over the network, there is no opportunity that the information cannot be acquired from the database. Also, in the case that the image processing apparatus is arranged in such a manner that the track back destination addresses corresponding to the Web pages to which the own appliance has accessed are registered and saved in the database, there is no opportunity that the information cannot be registered into the database due to the trouble occurred on the network.

Furthermore, the above-described determining unit may determine the track back destination address which is used in correspondence with the image read by the image reading unit based upon a track back destination address corresponding to a Web page to which either the own appliance or another appliance was accessed in the past.

With employment of the above-explained arrangement, even in such an image processing apparatus equipped with the print function but not with a high-grade display function, the track back destination address can be simply selected from the access history of the Web pages printed in the past.

The above-explained examples exemplify such an example that the track back destination address is selected from the access history of the Web page. Alternatively, the track back destination address may be acquired by employing other means.

Specifically, for instance, the image processing apparatus may be comprised of a data converting unit for converting the image read by the image reading unit into data which is represented by the read image. In this case, the determining unit determines the track back destination address which is used in correspondence with the image read by the image reading unit based upon a track back destination address which is contained in the data converted by the data converting unit.

In this case, images which should be converted by the data converting unit correspond to such images which represent predetermined data in accordance with at least a predetermined rule. Concretely speaking, images such as a character, a bar code, and a two-dimensional code may be involved in the images which should be converted by the data converting unit.

With employment of the above arrangement, the tack back destination address may be simply acquired from the images (character, bar code, two-dimensional bar code) read out by the image reading unit.

Also, the image processing apparatus may be comprised of a data reading unit capable of reading data from a detachable storage medium into which the data has been stored. In this case, the determining unit determines the track back destination address which is used in correspondence with the image read by the image reading unit based upon a track back destination address which is contained in the data read by the data reading unit.

In this case, the detachable storage medium implies various sorts of removable media well-known in the technical field, for example, optical disk media such as a memory card, CD, and DVD, magnetic disk media such as FD, and the like.

With employment of this arrangement, the track back destination address can be simply acquired from the detachable storage medium.

Also, the image processing apparatus may be comprised of a data receiving unit capable of receiving data from another terminal apparatus capable of communicating with the own appliance. In this case, the determining unit may determine the track back destination address which is used in correspondence with the image read by the image reading unit based upon a track back destination address which is contained in the data received by the data receiving unit.

In this case, another terminal apparatus capable of communicating with the own appliance implies a PC, and the like provided on the network, or another PC which is locally connected thereto a leased communication path different from the network.

With employment of this arrangement, the track back destination address can be simply acquired from another terminal apparatus.

Furthermore, the image processing apparatus may be comprised of an address list display unit for displaying a list of plural track back destination addresses which constitute address candidates to be processed; and an address selecting unit for selecting at least one address from the list of the track back destination addresses displayed by the address list display unit based upon an input operation received from a user. In this case, the determining unit determines the at least one address selected by the address selecting unit as the track back destination address which is used in correspondence with the image read by the image reading unit.

With employment of this arrangement, in the case that a plurality of track back destination addresses are present which constitute the address candidates to be processed, the address may be selected by displaying the list. As a result, the user can easily select the track back destination address.

Next, a program product, according to another aspect of the present invention, is such a program for causing a computer build in an image processing apparatus equipped with an image reading unit capable of reading an image from an original to execute a process operation which transmits various sorts of data can be transmitted via a network to a server which is equipped with a function for distributing an image received from a terminal apparatus over the network to another terminal apparatus over the network and a function for transmitting a track back notification with respect to a track back destination address, in which the program causes the computer to execute: a determining step for determining a track back address which is used in correspondence with the image read by the image reading unit; and a data transmitting step for transmitting both image data indicative of the image read by the image reading unit, and address data indicative of the track back destination address determined by the determining unit to the server.

If such a program is used, then the image processing apparatus equipped with the image reading unit capable of reading the image from the original may function as the image processing apparatus.

Next, various exemplary aspects of the present invention will be described by way of an example.

[Entire Arrangement of Image Processing System]

First, the entire arrangement of an image processing system will be described.

As shown in FIG. 1, the image processing system to be described below is provided with a multifunction device 1, a blog server 2, a track back blog server 3, and a PC (Personal Computer) 4, which can communicate with one another over a network 5. The multifunction device 1 is constructed so as to be able to use a detachable memory card 6 when being loaded therein.

Among those components, the multifunction device 1 functions as an image processing apparatus and is equipped with a telephone (voice communication) function, a scanner function, a printer function, a copier function, and a facsimile function. The multifunction device 1 also has a function of transmitting image (image data) scanned by the scanner function, to the blog server 2 as an article, and a function of transmitting, to the blog server 2, a track back destination address (address data) which is required when transmitting a track back notification to the track back blog server 3 from the blog server 2.

The blog server 2 is a server computer that provides a service according to a request from a client (e.g., multifunction device 1, the PC 4 or the like) which gains access over the network 5, upon reception of the request. More specifically, the blog server 2 has a function (article information distributing function) of storing an article (image scanned by scanner function of multifunction device 1 in this exemplary aspect) received from a terminal apparatus (multifunction device 1 in this exemplary aspect) on the network 5, and distributing the article to another terminal apparatus (e.g., PC 4) on the network 5. The blog server 2 also has a function (track back notification transmitting function) of transmitting a track back notification to a track back destination address when the track back destination address (address data) is transmitted from a terminal apparatus (multifunction device 1 in this exemplary aspect) on the network 5.

The track back blog server 3, like the blog server 2, is a server computer that provides a service according to a request from a client (e.g., multifunction device 1, PC 4 or the like) which gains access over the network 5, upon reception of the request. More specifically, the track back blog server 3 has a function (article information distributing function) of storing an article (blog article including either image or text) received from a terminal apparatus (e.g., PC 4) on the network 5, and distributing the article to another terminal apparatus (e.g., multifunction device 1) on the network 5. The track back blog server 3 also has a function (track back notification receiving function) of receiving a track back notification transmitted from a appliance on the network 5 (blog server 2 in this exemplary aspect). In this exemplary aspect, a track back destination address is set in an article distributed by the article information distributing function of the track back blog server 3. When the blog server 2 transmits a track back notification to the track back destination address, the track back notification is received by the track back notification receiving function of the track back blog server 3.

The PC 4 is an exemplified representative one of multiple terminal apparatuses present on the network 5. In this exemplary aspect, communications are carried out between the multifunction device 1 and the PC 4, and the PC 4 is used to exchange information on a track back destination address in the communications in a description to be given later. In addition, the PC 4 is also exemplified as a terminal apparatus which transmits an article to the track back blog server 3 (which uploads article) and a terminal apparatus to which an article is distributed from the track back blog server 3 (which downloads article). It should to be noted that the PC 4 is an exemplified representative one of multiple terminal apparatuses present on the network 5, and does not imply that there is a single PC 4 which executes all of the above-described process operations.

A portion of the network 5 is constructed by a local area network (LAN) while another portion thereof is constructed by a wide area network (WAN) such as the Internet. Relay appliances having a gateway function or a router function are disposed at individual locations on the network 5. Since such an arrangement of the network 5 is well known and the arrangement of the network 5 itself is not essential part of the present invention, a LAN and WAN are not particularly distinguished and various sorts of relay appliances are not illustrated in FIG. 1.

[Arrangement of Multifunction Device]

The arrangement of the multifunction device 1 will be described next.

The multifunction device 1 is equipped with a control unit 11, an operation unit 12, a display unit 13, a communication unit 14, a telephone communication unit 15, a reading unit 16, a printing unit 17, a storage unit 18, a memory card interface 19, and the like.

The control unit 11 is mainly constituted by a CPU, a ROM and a RAM, which are well-known in the field. In the control unit 11, the CPU executes process operation operations to be discussed later, in accordance with to a program stored in the ROM, whereby the control unit controls the individual units of the multifunction device 1. A portion of the program is stored in a programmable ROM (e.g., flash memory or the like), so that the version-up is possible as the program is overwritten with an update program loaded later via the communication unit 14 or the memory card interface 19.

The operation unit 12 is arranged by an operation panel having a key group for accepting an input operation made by a user. The operation panel contains function keys provided to operate the main functions of the multifunction device 1, one-touch keys provided to ensure the use of equivalent functions in simple procedures (e.g., one-touch operations) since these functions have been pre-registered, direction keys for instructing the direction in which a focus (cursor) is to be moved in the display area of the display unit 13, an OK key to set an input content, and a cancel key to cancel the input content.

The display unit 13 is provided so as to display thereon information with respect to a user, and contains a liquid crystal display capable of displaying several lines of character strings and simple symbols or the like.

The communication unit 14 comprises a network interface card (will be referred to as "NIC" hereinafter), and performs a process operation for communication over the network 5.

The telephone communication unit 15 performs a process operation for communication via a telephone line (not shown). The multifunction device 1 is provided with a hand set (receiver), a built-in speaker, an amplifier, etc. as the arrangement associated with the telephone function.

The reading unit 16 reads an image from a document set in an automatic document feeder (ADF) or a document placed on a contact glass of a flat bed, and produces image data for representing the image. The reading unit 16 is operated at the time of reading an image with the scanner function, reading a transmission image or with the facsimile function, or the like.

The printing unit 17 prints an image represented by image data on a sheet-shaped recording medium (e.g., recording paper). The printing unit 17 is operated at the time of printing an image with the printer function, printing a received image with the facsimile function, printing a copy image provided by the copier function, or the like.

The storage unit 18 contains a hard disk drive (HDD) or the like, in which information or the like required for the multifunction device 1 to be operated is stored. Application setting data 18a and print article database 18b are stored in the storage unit 18. Those data will be described in detail later.

The memory card interface 19 corresponds to a unit provided so as to access the memory card 6. When the memory card 6 is loaded into a memory card slot in the multifunction device 1, the multifunction device 1 can access data files stored in the memory card 6 via the memory card interface 19.

[Arrangement of Blog Server]

The arrangement of the blog server 2 will be described next.

The blog server 2 is equipped with a control unit 21, a communication unit 22, an article information storage unit 23, an article information distributing unit 24, etc.

The control unit 21 is mainly constituted by a CPU, a ROM and a RAM, which are well-known in the field. As software which constitutes an OS (Operating System) and server software are read into the RAM in the control unit 21, and the CPU executes various sorts of process operation operations in accordance with to the server software under the control of the OS, the individual units of the blog server 2 are controlled so as to execute a process operation according to a request issued from the client.

The communication unit 22 contains an NIC or the like, and performs a process operation for communication over the network 5.

The article information storage unit 23 contains a hard disk drive (HDD) or the like, and stores an article (image sent from multifunction device 1 in this exemplary aspect) received from a terminal apparatus (multifunction device 1 in this exemplary aspect) on the network 5. Plural sets of setting data 23a and registered article databases 23b are stored in the article information storage unit 23 in association with a plurality of users. Those data will be described in detail later.

Based on an article or the like stored in the article information storage unit 23, the article information distributing unit 24 performs a process operation for dynamically producing a Web page including the article, and performs a process operation for distributing the produced Web page to a requester via the communication unit 22, upon reception of a request from a terminal apparatus (e.g., multifunction device 1) on the network 5. The Web page generated here has a track back destination address inserted therein which is associated with the Web page. In the case that a track back notification to the track back destination address is received, an address assigned to the article to be the track back source address is inserted.

[Arrangement of Track Back Blog Server]

The arrangement of the track back blog server 3 will be described next.

The track back blog server 3 is equipped with a control unit 31, a communication unit 32, an article information storage unit 33, an article information distributing unit 34, etc.

The control unit 31 is mainly constituted by a CPU, a ROM and a RAM, which are well-known in the field. As software which constitutes an OS and server software are read into the RAM in the control unit 31, and the CPU executes various sorts of process operation operations in accordance with the server software under the control of the OS, the individual units of the track back blog server 3 are controlled so as to execute a process operation according to a request issued from the client.

The communication unit 32 contains an NIC or the like, and performs a process operation for communication over the network 5.

The article information storage unit 33 contains a hard disk drive (HDD) or the like, and stores an article received from a terminal apparatus (e.g., PC 4) on the network 5.

Based on an article or the like stored in the article information storage unit 33, the article information distributing unit 34 performs a process operation for dynamically producing a Web page including the article, and performs a process operation for distributing the produced Web page to a requester via the communication unit 32, upon reception of a request issued from a terminal apparatus (e.g., multifunction device 1) on the network 5. The produced Web page has a track back destination address inserted therein which is associated with the Web page. In the case that a track back notification to the track back destination address is received, an address assigned to the article to be the track back source address is inserted.

[Arrangement of PC]

The arrangement of the PC 4 will be described next.

The PC 4 is equipped with a control unit 41, an input unit 42, a display unit 43, a communication unit 44, a storage unit 45, etc.

The control unit 41 is mainly constituted by a CPU, a ROM and a RAM, which are well-known in the field. A BIOS (Basic Input Output System) and several pieces of basic setting data are stored in the ROM of the control unit 41. Software which constitutes an OS (Operating System) and programs, such as various sorts of application programs, are read into the RAM from the storage unit 45. As the CPU executes various sorts of process operation operations in accordance with to the programs stored in the ROM and the RAM, the individual units of the PC 4 are controlled. The OS of the PC 4 has a multi-window function so as to display a plurality of windows on the display unit 43 of the PC 4 and display various sorts of information for each window. Specific examples of the OS having such a multi-window function include Windows (registered trademark) and MacOS (registered trademark). As various functions that are provided by those OSes are publicly known, the detailed description of the multi-window function is omitted, but the following description is given on the premise that the PC 4 has various functions including the multi-window function provided by the Windows (registered trademark).

The input unit 42 is equipped with a keyboard and a pointing device (e.g., mouse) which a user uses to perform an input operation.

The display unit 43 contains a liquid crystal display.

The communication unit 44 contains an NIC or the like, and performs a process operation for communication over the network 5.

The storage unit 45 comprises a hard disk drive (HDD) or the like, and the OS, various application programs, and various data files are stored in the storage unit 45.

[Various Sorts of Data to be Used in Image Processing System]

Next, various kinds of data to be used in the image processing system will be described.

First, the application setting data 18*a* and the print article database 18*b* stored in the storage unit 18 of the multifunction device 1 will be described.

The application setting data 18*a* corresponds to data which is described by the XML (eXtensible Markup Language) with some data sandwiched between strings of characters called tags. More specifically, the application setting data 18*a* contains "user ID" and "server URL" as data, as shown in FIG. 2A. The "user ID" is described at a position sandwiched between a pair of tags which are two sets of character strings, "<user ID>" and "</user ID>"; "user ID" is "3" in the example shown in FIG. 2A. The "server URL", like the "user ID", is described at a position sandwiched between a pair of tags indicative of the "server URL". When a "user ID" is to be acquired from the application setting data 18*a*, therefore, the "user ID" can be acquired by searching for tags "<user ID>" and "</user ID>" corresponding to the "user ID" and extracting character strings described between the tags.

The application setting data 18*a* corresponds to data which is required when the multifunction device 1 accesses the blog server 2, and the "server URL" corresponds to an address assigned to the blog server 2 on the network 5, so that the multifunction device 1 can establish communication with the blog server 2 based on the "server URL". A "user ID" corresponds to an identifier assigned to each of a plurality of users, and there are unique identifiers different for different users. After establishing communication with the blog server 2 based on the "server URL", the multifunction device 1 sends the "user ID" to the blog server 2. Accordingly, the blog server 2 which has received the "user ID" can execute a process operation of selecting a set of the setting data 23*a* and the registered article database 23*b* based on the received "user ID".

The print article database 18*b* is likewise data described by the XML as shown in FIG. 2B. Some sets of article information (three sets of article information in example of FIG. 2B) as to an article printed by the multifunction device 1 are stored in the print article database 18*b* (one set of article information is portion sandwiched between tag "<article>" and "</article>"). One set of article information has an "URL" and "time" stored therein. The "URL" corresponds to data indicative of a track back destination address corresponding to an article printed by the multifunction device 1, and the "time" is data indicative of a time at which the article was printed by the multifunction device 1. When the multifunction device 1 has accessed the track back blog server 3 and has printed an article (Web page) to be distributed from the track back blog server 3, for example, one set of article information corresponding to the printed article is additionally registered in the print article database 18*b*.

Next, the setting data 23*a* and the registered article database 23*b* stored in the article information storage unit 23 of the blog server 2 will be described.

The setting data 23*a* is also data described by the XML as shown in FIG. 3A. The setting data 23*a* contains "base directory", "program", "page" and so forth as data. The "base directory" corresponds to data indicative of a directory having a unique path name assigned to each user (root directory for user). When the multifunction device 1 uploads an article to the blog server 2, the article is uploaded to a directory at a level lower than the "base directory". The "program" is the name of a blog program which is activated by the blog server 2. When the multifunction device 1 uploads an article to the blog server 2, the blog server 2 can activate a blog program as the multifunction device 1 designates a program name indicated by the "program" and included in the URL. The "page" corresponds to data indicative of a counter value which is counted up every time the multifunction device 1 uploads an article to the blog server 2. The counter value is used as a portion of an address assigned to the article uploaded to the blog server 2 from the multifunction device 1. Accordingly, when the multifunction device 1 uploads a plurality of articles to the blog server 2, addresses (URLs) assigned to the respective articles do not overlap with each other.

The registered article database 23*b* is also data which is described by the XML as shown in FIG. 3B. Some sets of article information (three sets of article information in example of FIG. 3B) as to an article uploaded to the blog server 2 from the multifunction device 1 are stored in the registered article database 23*b*. One set of article information has an "URL" and "time" stored therein. The "URL" is data indicative of an address assigned to the article uploaded to the blog server 2, and the "time" is data indicative of a time at which the article was uploaded to the blog server 2. When an article is uploaded to the blog server 2 from the multifunction device 1, one set of article information corresponding to the uploaded article is additionally registered in the registered article database 23*b*.

A track back list to be stored in the storage unit 45 of the PC 4 or the memory card 6 or the like will be described next.

The track back list is likewise data described by the XML as shown in FIG. 4. The track back list corresponds to data which can be arbitrarily edited by a user on the multifunction device 1 or the PC 4. Some sets of track back destination information (three sets of track back destination information in the example of FIG. 4) as to a track back destination address are stored in the track back list. One set of track back destination information has an "URL" and "registration time" stored therein. The "URL" is data indicative of a track back destination address, and the "registration time" is data indicative of a time at which one set of track back destination information was registered in the track back list.

[Process Operations to be Executed by Each Appliance in Image Processing System]

Process operations to be executed by individual appliances employed in the image processing system will be explained referring to FIGS. 5 to 21.

[Multifunction Device Process Operations]

Figure 5:
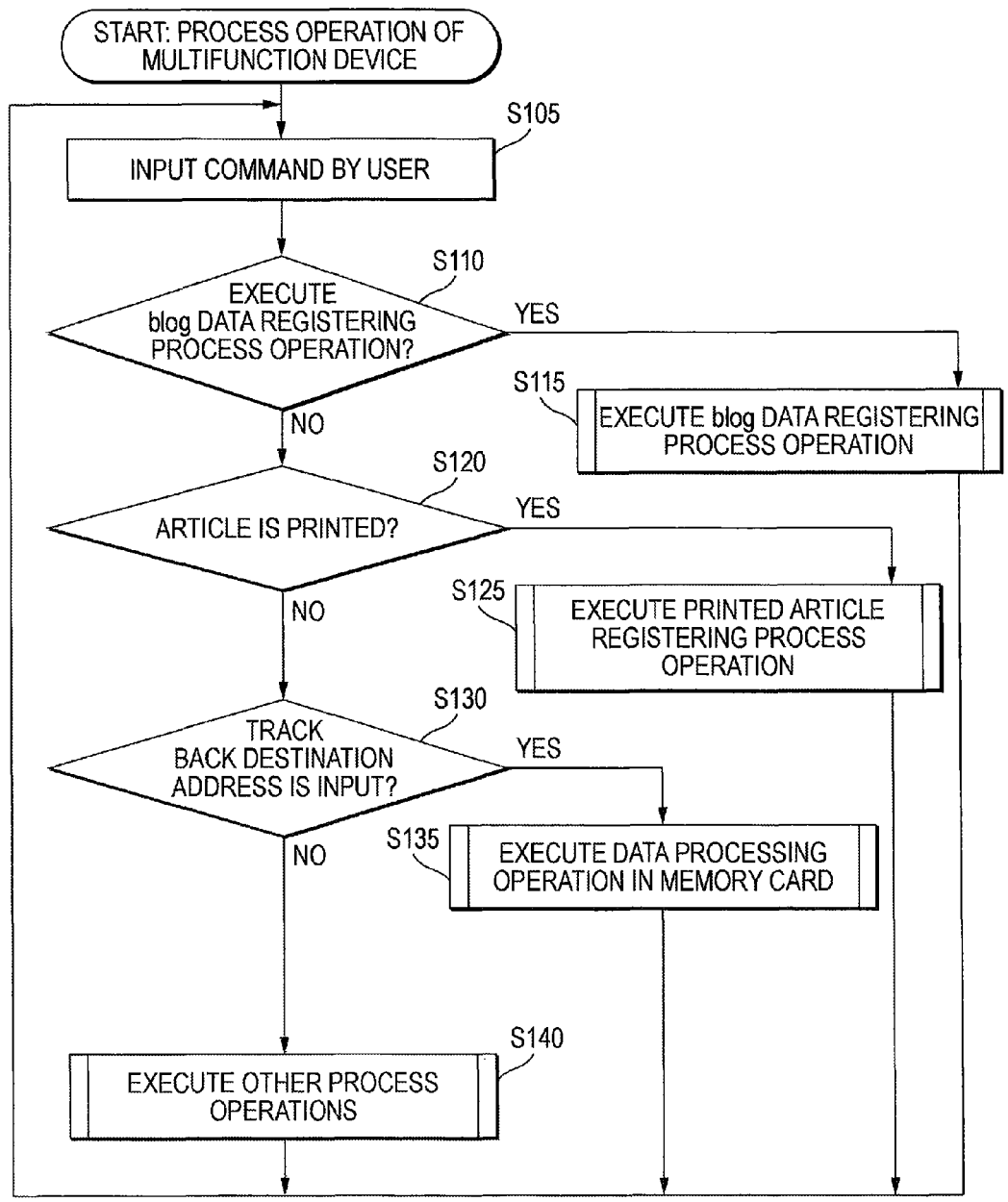
FIG. 5 is a flow chart for explaining a process operation of a multifunction device.

FIG. 5 is a flow chart for explaining a multifunction device process operation which is executed as the multifunction device 1 is activated.

When the process operation starts, the multifunction device 1 accepts a command input first as shown in FIG. 5 (S105). In this case, the user can input a command through a key operation on the operation unit 12.

When receiving a command input in the process operation of S105, the multifunction device 1 determines as to whether or not the received command is a command for instructing a blog data registering process operation (S110), and executes the blog data registering process operation (S115) when the command instructs the blog data registering process operation (S110: YES). The details of the blog data registering process operation will be given later. When the blog data registering process operation is finished, the process operation is returned to the process operation of S105.

When the received command is not a command for instructing the blog data registering process operation in the process operation of S110 (S110: NO), the multifunction device 1 determines as to whether the received command is a command for instructing to print an article or not (S120), and executes a printed article registering process operation (S125) when the command instructs printing of an article (S120: YES). The details of the printed article registering process operation will be given later. When the printed article registering process operation is finished, the process operation is returned to the process operation of S105.

When the received command is not a command for instructing to print an article in the process operation of S120 (S120: NO), the multifunction device 1 determines as to whether the received command is a command for instructing to input a track back destination address or not (S130), and executes data processing operation in the memory card (S135) when the command instructs inputting of a track back destination address (S130: YES). The details of the data processing operation in the memory card will be given later. When the data processing operation in the memory card is finished, the process operation is returned to the process operation of S105.

When the received command is not a command for instructing to input a track back destination address in the process operation of S130 (S130: NO), other process operations are executed (S140). While other process operations contain various sort of process operations to be executed by the multifunction device 1, none of the process operations are relevant to the essential portions of the invention, their detailed descriptions are omitted. When the other process operations are finished, the process operation is also returned to the process operation of S105.

As described above, when each of the process operations of the steps S115, S125, S135, S140 is finished, the process operation is returned to the process operation of S105 in each case, so that the multifunction device 1 again repeats execution of the process operations subsequent to the step S105.

[Blog Data Registering Process Operations]

The detailed contents of the blog data registering process operation (process operation of S115 in FIG. 5) will be given next.

Figure 6:
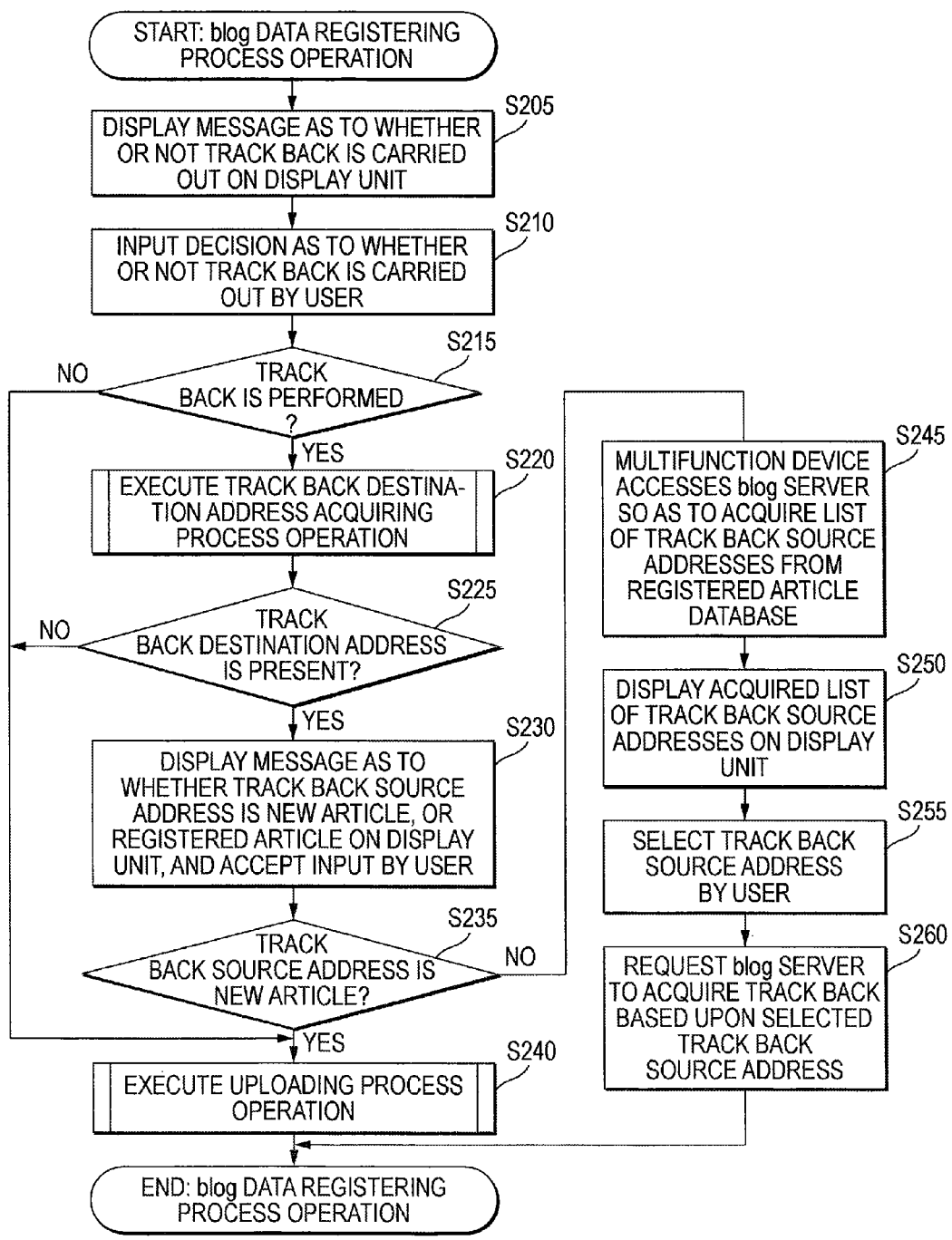
FIG. 6 is a flowchart for explaining a blog data registering process operation.

FIG. 6 is a flow chart for the blog data registering process operation.

When this process operation starts, the multifunction device 1 first displays a message as to whether or not to perform track back on the display unit 13 (S205), and accepts from the user an input as to whether or not to perform track back (S210), as shown in FIG. 6. In this case, the user can arbitrarily make an input as to whether or not to perform track back through a key operation on the operation unit 12.

Upon reception of an input made by the user in the process operation of S210, the multifunction device 1 determines as to whether or not to execute track back (S215). In case of executing track back (S215: YES), a track back destination address acquiring process operation is executed (S220). The details of this process operation will be given later. In the track back destination address acquiring process operation, there is either a status where a single track back destination address can be acquired or another status where no track back destination addresses can be acquired.

Accordingly, the multifunction device 1 determines as to whether or not there is a track back destination address which could be acquired in the track back destination address acquiring process operation (S225). When a track back destination address is acquired (S225: YES), the multifunction device 1 displays on the display unit 13 a message for inquiring the user as to whether the track back source address is a new article or a registered article, and accepts an input from the operation unit 12 made by the user (S230). When the user wants to set an address assigned to an article (image) to be uploaded to the blog server 2 as the track back source address, the user performs an input operation to indicate the article is a new one. When the user wants to set an address assigned to an article (image) already uploaded to the blog server 2 as the track back source address, the user performs an input operation to indicate the article is a registered one.

Upon reception of an input made by the user in the process operation of S230, the multifunction device 1 determines as to whether the user's input is a new article or not (S235). When the input article is a new article (S235: YES), the multifunction device 1 executes an upload process operation (S240). The details of the upload process operation will be given later. When the upload process operation is finished, the multifunction device 1 uploads a new article to the blog server 2. The blog server 2 is requested to send a track back notification having an address assigned to the new article as a track back source address and the address acquired in the process operation of S220 as a track back destination address. After completion of the upload process operation of the step S240, the blog data registering process operation shown in FIG. 6 is terminated.

When the decision in the process operation of S215 results in execution of no track back (S215: NO), or when the decision in the process operation of S225 results in that no track back destination addresses have been acquired (S225: NO), the process operations of the step S220, S230 and S235 will be skipped and the upload process operation of the step S240 is executed. When each process operation of the steps S215, S225 results in a negative decision, the contents of the upload process operation whose details will be given later slightly differ from the contents thereof when each process operation results in a positive decision. Specifically, while both cases are the same in that execution of the upload process operation uploads a new article to the blog server 2 from the multifunction device 1, the "process operation for the multifunction device 1 to request the blog server 2 to send a track back notification" is not executed. After the upload process operation of the step S240 is finished, the blog data registering process operation shown in FIG. 6 is terminated.

There may be a case in which the decision of the process operation S235 does not result in uploading of a new article (S235: NO), in such a case the upload process operation of the step S240 does not take place, but the process operations of the steps S245 to S260 are executed instead.

That is, first, the multifunction device 1 accesses the blog server 2 and acquires a list of track back source address from the registered article database 23b (S245). More specifically, the multifunction device 1 first requests the blog server 2 to present a list of track back source addresses. At the time of making the request, the multifunction device 1 reads the "user ID" and the "server URL" from the application setting data 18a stored in the storage unit 18, and transmits data including the "user ID" to the blog server 2 with the address indicated by the "server URL" as the transmission destination. The blog server 2 which has received the data specifies one data set from plural data sets stored in the article information storage unit 23 based on the "user ID" included in the received data, reads the registered article database 23b included in the specified single data set, and transmits the registered article database 23b to the multifunction device 1. As a result, the multifunction device 1 receives data equivalent to the registered article database 23b, and can acquire a list of track back source addresses.

After acquiring the list of track back source addresses this manner, the multifunction device 1 displays the acquired list of track back source addresses on the display unit 13 (S250), and accepts selection of a track back source address made by the user through the operation unit 12 (S255). In this case, the user can arbitrarily select a single track back source address from the displayed list of track back source addresses by a key operation on the operation unit 12.

Upon reception of the user's input in the process operation of S255, the multifunction device 1 requests the blog server 2 to track back based on the selected track back source address (S260). More specifically, the blog server 2 is requested to send a track back notification indicating the address selected in the process operation of S255 as the track back source address, and the address acquired in the process operation of S220 as the track back destination address. After completion of the process operation of S260, the blog data registering process operation shown in FIG. 6 is terminated.

[Track Back Destination Address Acquiring Process Operations]

Next, the detailed contents of the track back destination address acquiring process operation (process operation of step S220 in FIG. 6) will be given.

Figure 7:
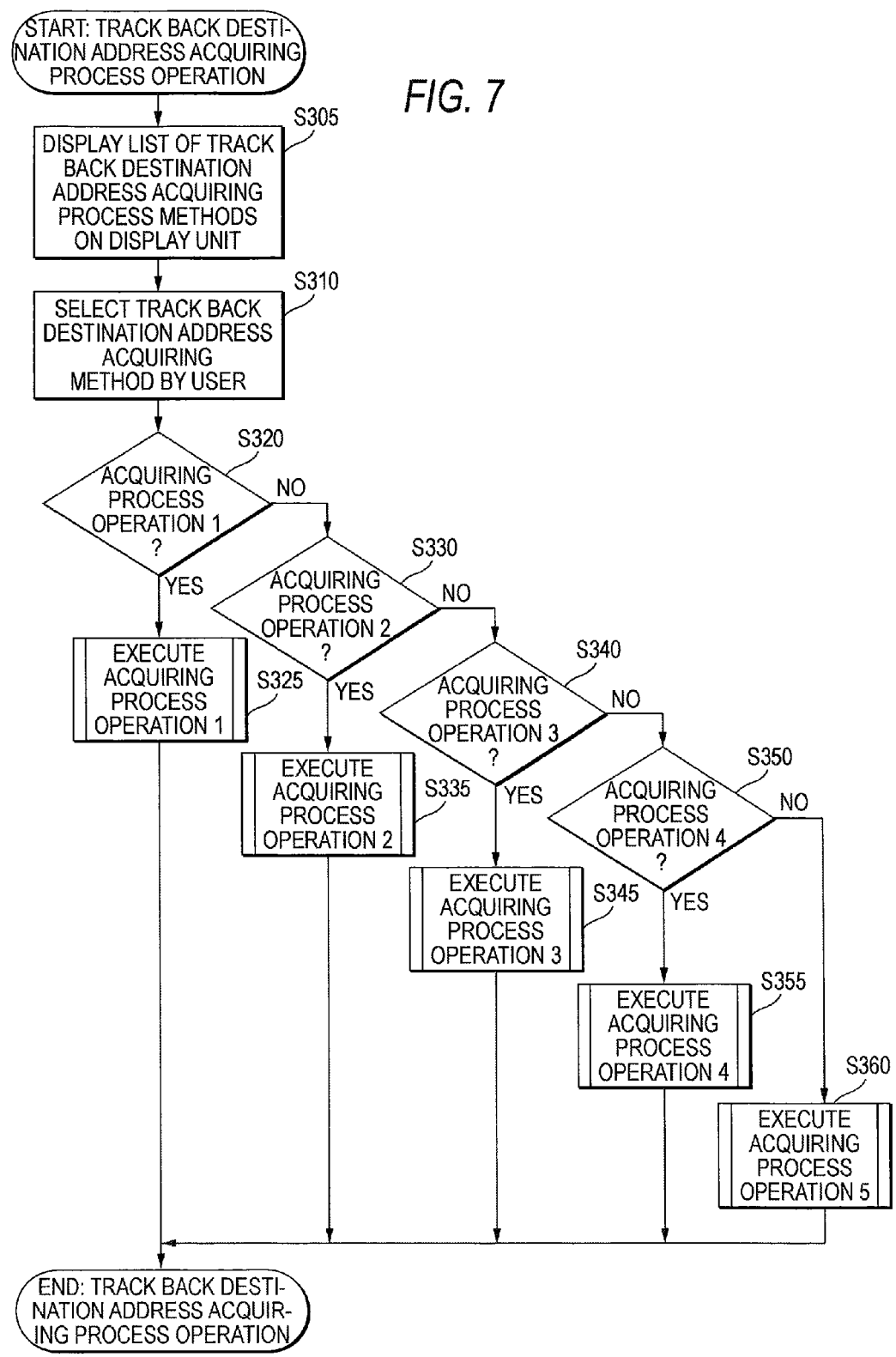
FIG. 7 is a flow chart for explaining a process operation for acquiring a track back destination address.

FIG. 7 is a flowchart for the track back destination address acquiring process operation.

When the process operation starts, the multifunction device 1 first displays a list of track back destination address acquisition methods on the display unit 13 (S305), and acquires the track back destination address acquisition method entered by the user through the operation unit 12 (S310). There are five track back destination address acquisition methods (first to fifth acquisition process operations) available, and the user can select one acquisition method from the first to fifth acquisition process operations by a key operation on the operation unit 12 in the process operation of a step S310.

Subsequently, the multifunction device 1 determines as to whether the acquisition method selected in the process operation of the step S310 is the first acquisition process operation or not (S320). When the first acquisition process operation is selected (S320: YES), the multifunction device 1 executes the first acquisition process operation (S325). The details of the first acquisition process operation will be given later. When the first acquisition process operation of S325 is finished, the track back destination address acquiring process operation shown in FIG. 7 is terminated.

When the first acquisition process operation is not selected (S320: NO), a determination is made as to whether the acquisition method selected in the process operation of S310 is the second acquisition process operation or not (S330). When the second acquisition process operation is selected (S330: YES), the second acquisition process operation is executed (S335). The details of the second acquisition process operation will be given later. When the second acquisition process operation of S335 is finished, the track back destination address acquiring process operation shown in FIG. 7 is accomplished.

When the second acquisition process operation is not selected (S330: NO), a determination is made as to whether the acquisition method selected in the process operation of S310 is the third acquisition process operation or not (S340). When the third acquisition process operation is selected (S340: YES), the third acquisition process operation is executed (S345). The details of the third acquisition process operation will be given later. When the third acquisition process operation of S345 is finished, the track back destination address acquiring process operation shown in FIG. 7 is accomplished.

When the third acquisition process operation is not selected (S340: NO), a determination is made as to whether the acquisition method selected in the process operation of S310 is the fourth acquisition process operation or not (S350). When the fourth acquisition process operation is selected (S350: YES), the fourth acquisition process operation is executed (S355). The details of the fourth acquisition process operation will be given later. When the fourth acquisition process operation of S355 is finished, the track back destination address acquiring process operation shown in FIG. 7 is accomplished.

When the fourth acquisition process operation is not selected (S350: NO), the fifth acquisition process operation is executed (S360). The details of the fifth acquisition process operation will be given later. When the fifth acquisition process operation of the step S360 is finished, the track back destination address acquiring process operation shown in FIG. 7 is accomplished.

[First Acquisition Process Operations]

Next, the details of the first acquisition process operation (process operation of S325 in FIG. 7) will be given.

Figure 8:
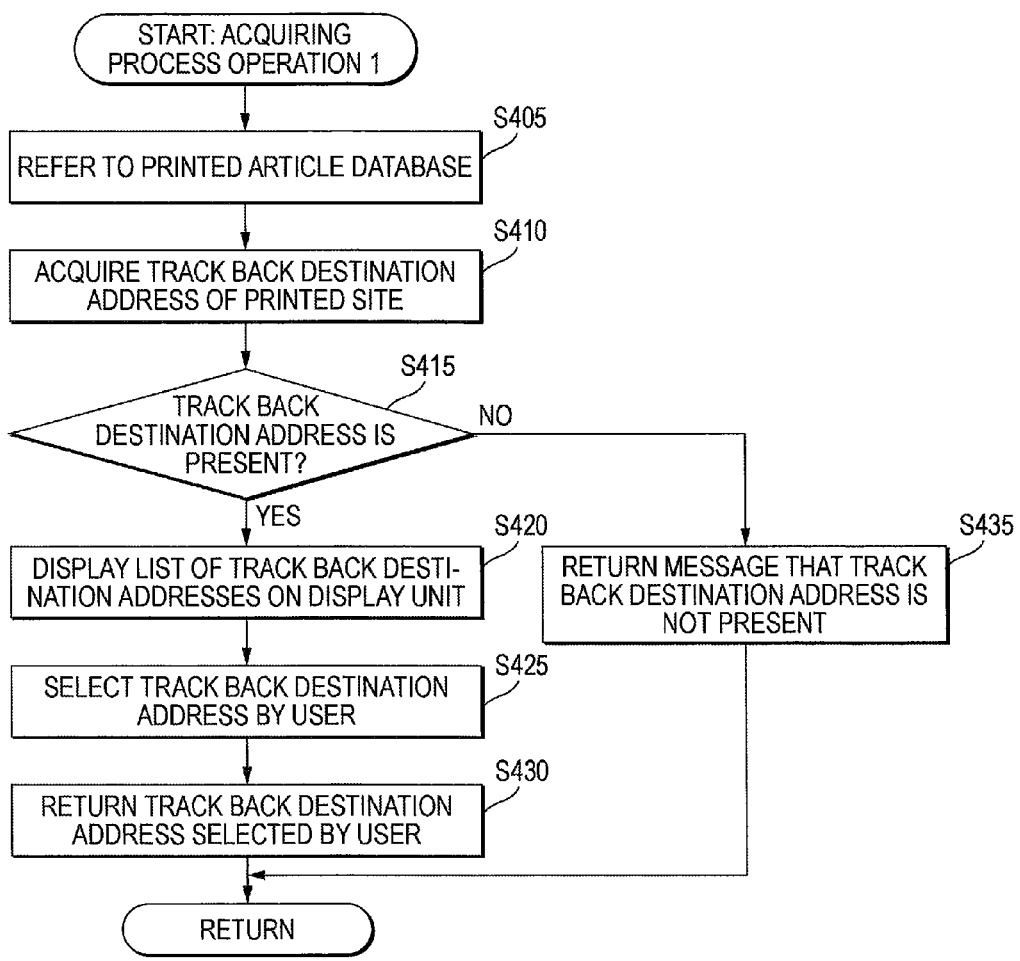
FIG. 8 is a flowchart for describing an acquisition process operation 1.

The first acquisition process operation corresponds to such a process operation in which the multifunction device 1 acquires a track back destination address referring to the print article database 18b located in the appliance. FIG. 8 is a flow chart for the first acquisition process operation.

When the process operation starts, as shown in FIG. 8, the multifunction device 1 first refers to the print article database 18b stored in the storage unit 18 (S405) to acquire the track back destination address of a site where the multifunction device 1 has performed a printing operation (S410).

As explained already, every time the multifunction device 1 accesses a server to be a track back destination (e.g., the track back blog server 3) and prints an article (Web page) distributed from the server, a set of article information corresponding to the printed article is additionally registered in the print article database 18b (see FIG. 2(b)). The process operation at the time of printing an article will be described in detail in the description of the printed article registering process operation (see FIG. 19) to be discussed later. In the process operation of the step S410, if one or more sets of article information are registered in the print article database 18b, all the track back destination addresses corresponding to the one or more sets of article information are acquired.

Subsequently, the multifunction device 1 determines as to whether or not there is at least one track back destination address acquired in the process operation of the step S410 (S415). When there is at least one track back destination address (S415: YES), the multifunction device 1 displays a list of the track back destination addresses on the display unit 13 (S420), and accepts a selection of a track back destination address by the user (S425).

Figure 9:
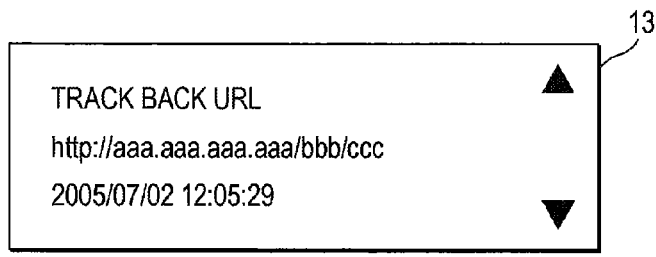
FIG. 9 is an explanatory diagram for explaining a display example of a tack back destination address on a display unit.

Through the process operation of the step S420, the display unit 13 displays information as to one track back destination (lead, track back destination address, registration time, etc.) as shown in FIG. 9. When there is information on multiple track back destinations, a triangular mark is displayed at the right end of the display unit 13. With the triangular mark displayed, as an up or down key on the operation unit 12 is operated, information on a next single track back destination can be displayed further. By making a key operation on the operation unit 12, the user can display information on track back destinations on the display unit 13 one by one, and can select an arbitrary track back destination address while viewing the contents of the information.

When the user selects one track back destination address in the process operation of the step S425, the track back destination address selected by operating the operation unit 12 of the multifunction device 1 is returned to the higher-rank process operation where the first acquisition process operation was executed (track back destination address acquiring process operation shown in FIG. 7) (S430) after which the first acquisition process operation is accomplished.

When the decision in the process operation of the step S415 results in absence of a track back destination address (S415: NO), the multifunction device 1 returns the absence of a track back destination address to the higher-rank process operation where the first acquisition process operation was executed (track back destination address acquiring process operation shown in FIG. 7) (S435) after which the first acquisition process operation is accomplished.

As a consequence of the first acquisition process operation, either one track back destination address is returned to, or no track back destination addresses are returned to, the track back destination address acquiring process operation shown in FIG. 7.

[Second Acquisition Process Operations]

Next, the detailed contents of the second acquisition process operation (process operation of S335 in FIG. 7) will be given.

Figure 10:
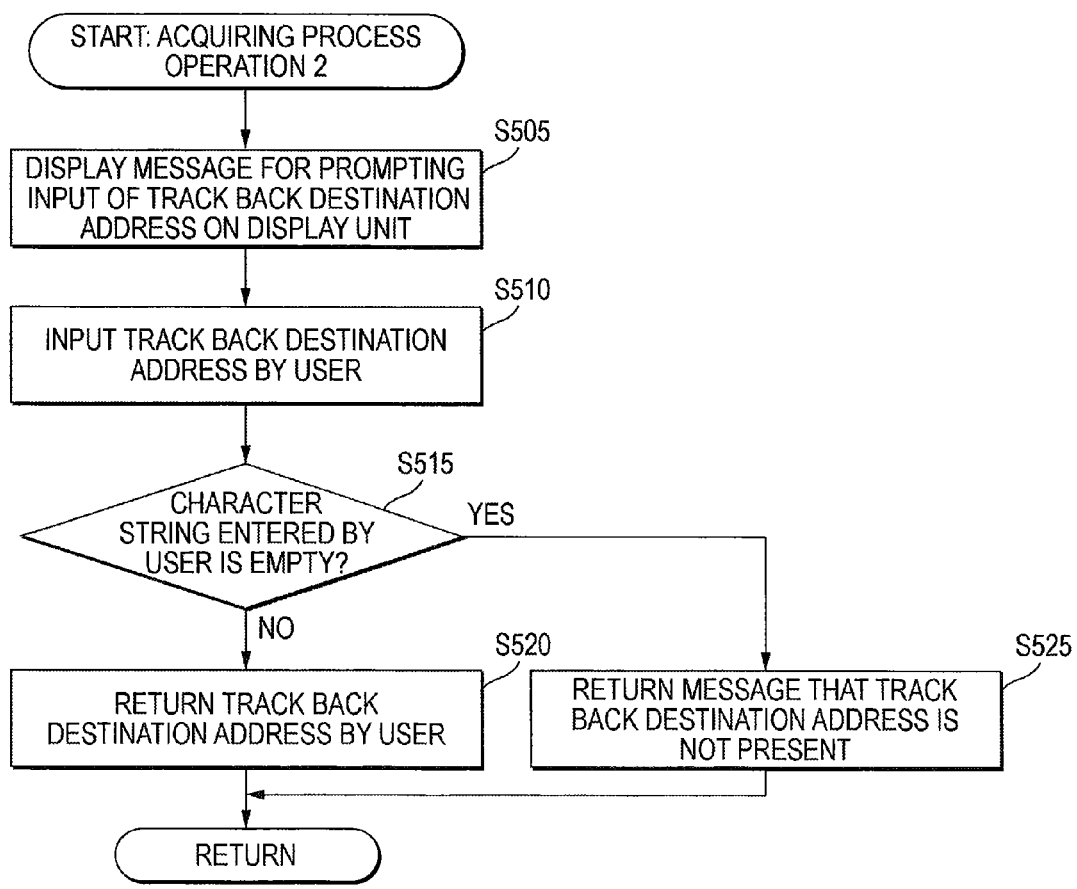
FIG. 10 is a flow chart for describing an acquisition process operation 2.

The second acquisition process operation corresponds to such a process operation in which the multifunction device 1 acquires a track back destination address which is entered directly by the user through the operation unit 12 of the multifunction device 1. FIG. 10 is a flow chart for the second acquisition process operation.

Figure 11:
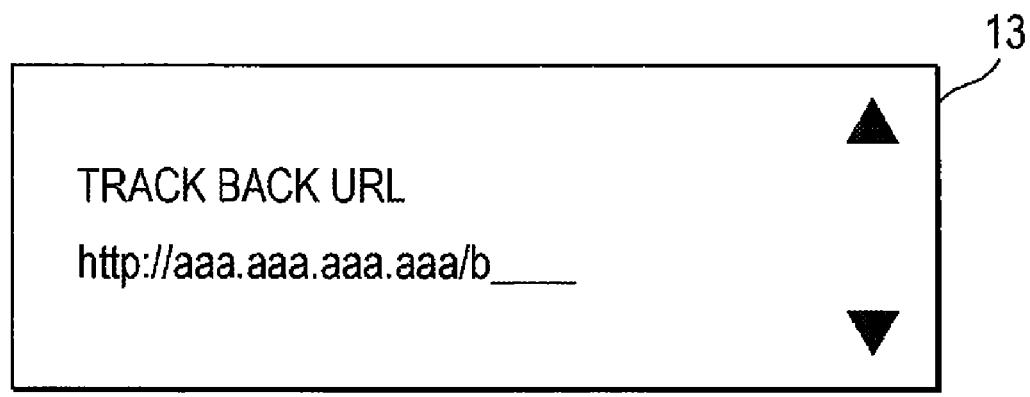
FIG. 11 is an explanatory diagram for explaining a display example of a tack back destination address on the display unit.

When the process operation starts, as shown in FIG. 10, the multifunction device 1 first displays a message on the display unit 13, namely this message for prompting to input a track back destination address (S505), and accepts a track back destination address inputted by the user (S510). At this time, the display unit 13 displays a screen for inputting a track back destination address as shown in FIG. 11, so that the user can input a track back destination address by a key operation on the operation unit 12.

When the input of the track back destination address is received in the process operation of the step S510, the multifunction device 1 then determines as to whether a character string input by the operation unit 12 is empty or not (S515). When some character string is inputted (S515: NO), the track back destination address input by the operation unit 12 of the multifunction device 1 is returned to the higher-rank process operation in which second first acquisition process operation was executed (track back destination address acquiring process operation shown in FIG. 7) after which the second acquisition process operation is accomplished.

When the decision in the process operation of the step S515 results in that the character string input by the operation unit 12 is empty (S515: YES), the multifunction device 1 returns the absence of a track back destination address to the higher-rank process operation in which the second acquisition process operation was executed (track back destination address acquiring process operation shown in FIG. 7) (S525) after which the second acquisition process operation is ended.

As a consequence of the second acquisition process operation, either one track back destination address is returned to, or no track back destination addresses are returned to, the track back destination address acquiring process operation shown in FIG. 7.

[Third Acquisition Process Operations]

Next, the detailed contents of the third acquisition process operation (process operation of step S345 in FIG. 7) will be given.

Figure 12:
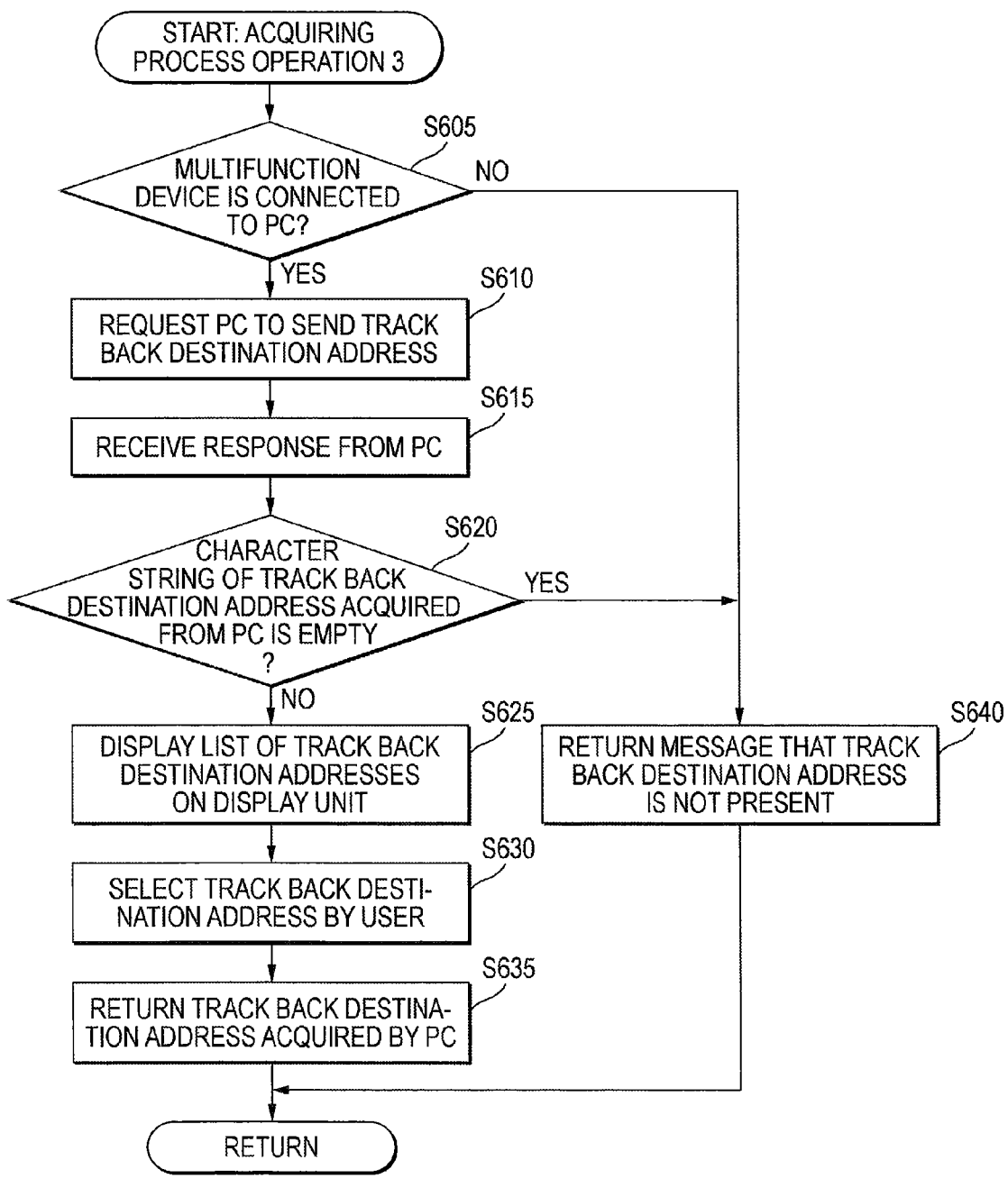
FIG. 12 is a flow chart for describing an acquisition process operation 3.

The third acquisition process operation corresponds to such a process operation in which the multifunction device 1 acquires a track back destination address through communications with the PC 4. FIG. 12 is a flow chart for the third acquisition process operation.

When the process operation starts, as shown in FIG. 12, the multifunction device 1 first determines as to whether the multifunction device 1 and the PC 4 are connected together over the network 5 or not (S605). In this case, when the multifunction device 1 transmits an acknowledgement request to the PC 4 and the PC 4 returns an acknowledgement to the acknowledgement request, a determination is made that the multifunction device 1 and the PC 4 are connected to each other. When the multifunction device 1 and the PC 4 are connected (S605: YES), the multifunction device 1 requests the PC 4 to input a track back destination address (S610).

Figure 13:
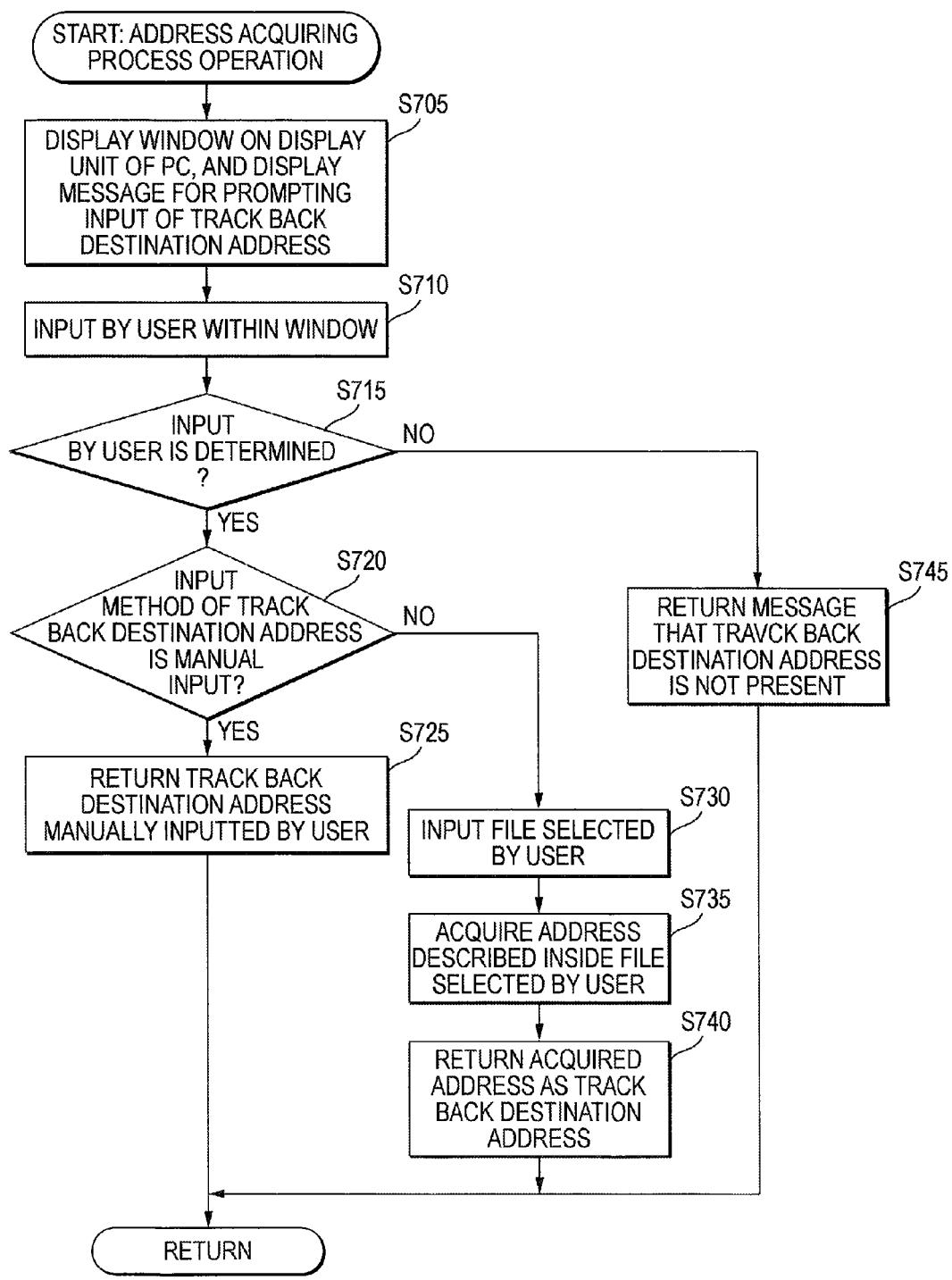
FIG. 13 is a flow chart for explaining an address acquiring process operation executed on the side of a PC.
Figure 14:
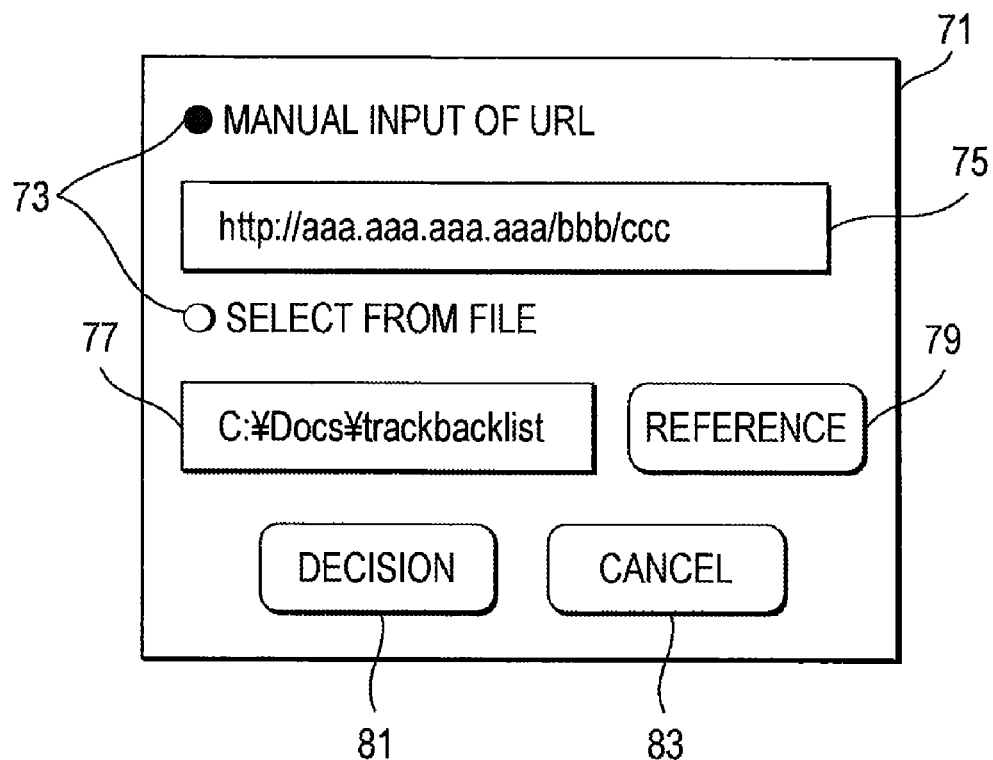
FIG. 14 is an explanatory diagram for explaining windows displayed on a display unit of the PC.

A description will now be made of an address acquisition process operation to be executed by the PC 4 which has received the request in the process operation of S610. FIG. 13 is a flow chart for the address acquisition process operation which is executed by the PC 4.

When the request made in the process operation of the step S610 is received from the multifunction device 1, the PC 4 first displays a window on the display unit 43 of the PC 4 and shows a message for prompting to input a track back destination address (S705) as shown in FIG. 13. The process operation of the step S705 causes the display unit 43 of the PC 4 to display a window 71 shown in FIG. 14. The window 71 is provided with a radio button 73, an URL input field 75, a path name input field 77, a reference button 79, an execute button 81, a cancel button 83, etc. The radio button 73 allows the user to alternatively select "manual entry of URL" or "select from a file" as a way of inputting an address (URL). The URL input field 75 is used when the "manual entry of URL" is selected by the radio button 73. The path name input field 77 is used when the "select from a file" is selected by the radio button 73. The reference button 79 is depressed to use the GUI to select a path name to be input to the path name input field 77. The execute button 81 is to be depressed to set the input contents on the window 71. The cancel button 83 is depressed to cancel the input contents on the window 71.

When displaying the window 71, the PC 4 is brought into a status for accepting an input to be made by the user (S710). In this case, the user can operate the input unit 42 to perform selection with the radio button 73, an input to the URL input field 75 or the path name input field 77, a depression of the reference button 79, the execute button 81 or the cancel button 83, or the like. When either the execute button 81 or the cancel button 83 is depressed, the process operation of S710 will be ended.

When the process operation of S710 is terminated, the PC 4 determines as to whether the user's input has been settled or not (S715). In the process operation of the step S715, it is determined that the user's input has been settled when the process operation of the step S710 has been finished by the depression of the execute button 81, and that the user's input has not been settled when the process operation of the step S710 has been finished by the depression of the cancel button 83.

When the decision in the process operation of S715 results in that the user's input has been settled (S715: YES), the PC 4 determines as to whether the method of inputting the track back destination address is manual or not, based on the result of selection with the radio button 73 (S720).

When the decision in the process operation of the step S720 results in that the method of inputting the track back destination address is manual (S720: YES), the address input in the URL input field 75 manually made by the user is returned as the track back destination address to the multifunction device 1 (S725) after which the address acquisition process operation shown in FIG. 13 is ended.

When the decision in the process operation of the step S720 results in that the method of inputting the track back destination address is not manual (S720: NO), an input from a file having a path name designated in the path name input field 77 by the user (S730), and an address (track back destination information) described in the file is acquired (S735). A file designatable by the path name input field 77 corresponds to a track back list file having a data structure as shown in FIG. 4, and multiple sets of track back destination information are stored therein. Through the process operation of the step S735, the PC 4 acquires all of multiple sets of track back destination information present in the file. When the process operation of the step S735 is finished, the PC 4 returns the acquired addresses (all of track back destination information in file) as the track back destination addresses to the multifunction device 1 (S740) after which the address acquisition process operation shown in FIG. 13 is ended.

Further, when the decision in the process operation of the step S715 results in that the user's input has not been settled (S715: NO), the PC 4 returns absence of a track back destination address to the multifunction device 1 (S745) after which the address acquisition process operation shown in FIG. 13 is accomplished.

As a consequence of executing the above-described process operations by the PC 4, the PC 4 either returns one track back destination address or two or more track back destination addresses as an acknowledgement, or information indicating absence of any track back destination address to the multifunction device 1. A description is now returned to the description of the process operation of the multifunction device 1 (third acquisition process operation shown in FIG. 12).

When one of the acknowledgements is returned from the PC 4, the multifunction device 1 receives the acknowledgement from the PC 4 (S615). Then, first, the multifunction device 1 determines as to whether the character string of the track back destination address acquired by the PC 4 is empty or not, based on the acknowledgement from the PC 4 (S620).

If one track back destination address or two or more track back destination addresses are returned to the multifunction device 1 from the PC 4 as an acknowledgement, it is so determined that the character strings of the track back destination addresses acquired by the PC 4 are not empty (S620: NO). In this case, the multifunction device 1 displays a list of the track back destination addresses on the display unit 13 of the multifunction device 1 (S625), and accepts a selection of the track back destination addresses by the user (S630).

Through the process operation of the step S625, the display unit 13 displays information as to one track back destination as shown in FIG. 9, as executed in the process operation of the step S420. When information on multiple track back destinations is acquired from the PC 4, a triangular mark is displayed at the right end of the display unit 13, so that the user can display information on track back destinations on the display unit 13 one by one by making a key operation on the operation unit 12. In the process operation of the step S630, viewing the contents of the information, the user can arbitrarily select one track back destination address.

When the user selects one track back destination address in the process operation of the step S630, the user operates the operation unit 12 of the multifunction device 1 so as to return the selected track back destination address to the higher-rank process operation in which the third acquisition process operation was executed (track back destination address acquiring process operation shown in FIG. 7) (S635) after which the third acquisition process operation is accomplished.

When the decision in the process operation of S620 results in that character string of the track back destination address acquired by the PC 4 is empty (S620: YES), the multifunction device 1 returns the absence of a track back destination address to the higher-rank process operation in which the third acquisition process operation was executed (track back destination address acquiring process operation shown in FIG. 7) (S640) after which the third acquisition process operation is accomplished.

As a consequence of the third acquisition process operation, either one track back destination address is returned to, or no track back destination addresses are returned to, the track back destination address acquiring process operation shown in FIG. 7.

[Fourth Acquisition Process Operations]

Next, the detailed contents of the fourth acquisition process operation (process operation of S355 in FIG. 7) will be given.

Figure 15:
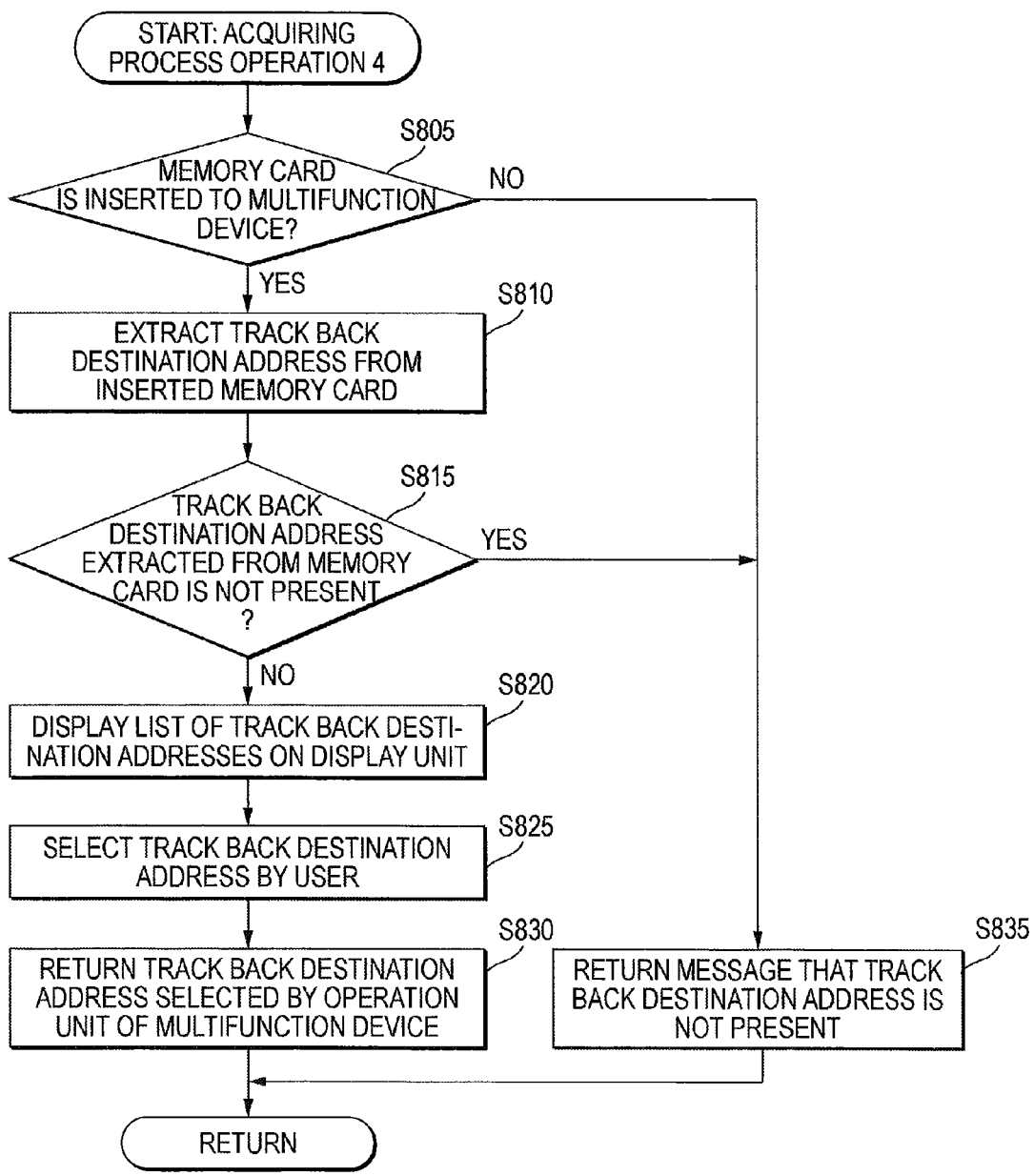
FIG. 15 is a flow chart for describing an acquisition process operation 4.

The fourth acquisition process operation corresponds to such a process operation in which the multifunction device 1 acquires a track back destination address from the track back list stored in the memory card 6. FIG. 15 is a flow chart for the fourth acquisition process operation.

When the process operation starts, as shown in FIG. 15, the multifunction device 1 first determines as to whether the memory card 6 is loaded into the multifunction device 1 or not (S805). When the memory card 6 is loaded into the multifunction device 1 (S805: YES), a track back destination address is extracted from the inserted memory card 6 (S810).

A file stored in the memory card 6 corresponds to a track back list file having a data structure as shown in FIG. 4, and multiple sets of track back destination information are stored therein. Through the process operation of the step S810, the multifunction device 1 extracts all of multiple sets of track back destination information present in the file.

Then, the multifunction device 1 determines as to whether the track back destination address extracted from the memory card 6 is not present or not (S815). When one track back destination address or two or more track back destination addresses are extracted from the memory card 6 (S815: NO), the multifunction device 1 displays a list of the track back destination addresses on the display unit 13 (S820), and accepts a selection of a track back destination address by the user (S825).

Through the process operation of the step S820, the display unit 13 displays information as to one track back destination as shown in FIG. 9, as executed in the process operations of the steps S420 and S625. When information on multiple track back destinations is extracted from the memory card 6, a triangular mark is displayed at the right end of the display unit 13, so that the user can display information on track back destinations on the display unit 13 one by one by making a key operation on the operation unit 12. In the process operation of the step S825, viewing the contents of the information, the user can arbitrarily select one track back destination address.

When the user selects one track back destination address in the process operation of the step S825, the user operates the operation unit 12 of the multifunction device 1 to return the selected track back destination address to the higher-rank process operation in which the fourth acquisition process operation was executed (track back destination address acquiring process operation shown in FIG. 7) (S830) after which the fourth acquisition process operation is ended.

When the decision in the process operation of the step S805 results in that the memory card 6 is not loaded into the multifunction device 1 (S805: YES), or when the decision in the process operation of the step S815 results in that no track back destination addresses are extracted from the memory card 6 not at all (S815: YES), the multifunction device 1 returns the absence of a track back destination address to the higher-rank process operation in which the fourth acquisition process operation was executed (track back destination address acquiring process operation shown in FIG. 7) (S835) after which the fourth acquisition process operation is ended.

As a consequence of the fourth acquisition process operation, either one track back destination address is returned to, or no track back destination addresses are returned to, the track back destination address acquiring process operation shown in FIG. 7.

[Fifth Acquisition Process Operations]

Next, the detailed contents of the fifth acquisition process operation (process operation of step S360 in FIG. 7) will be given.

Figure 16:
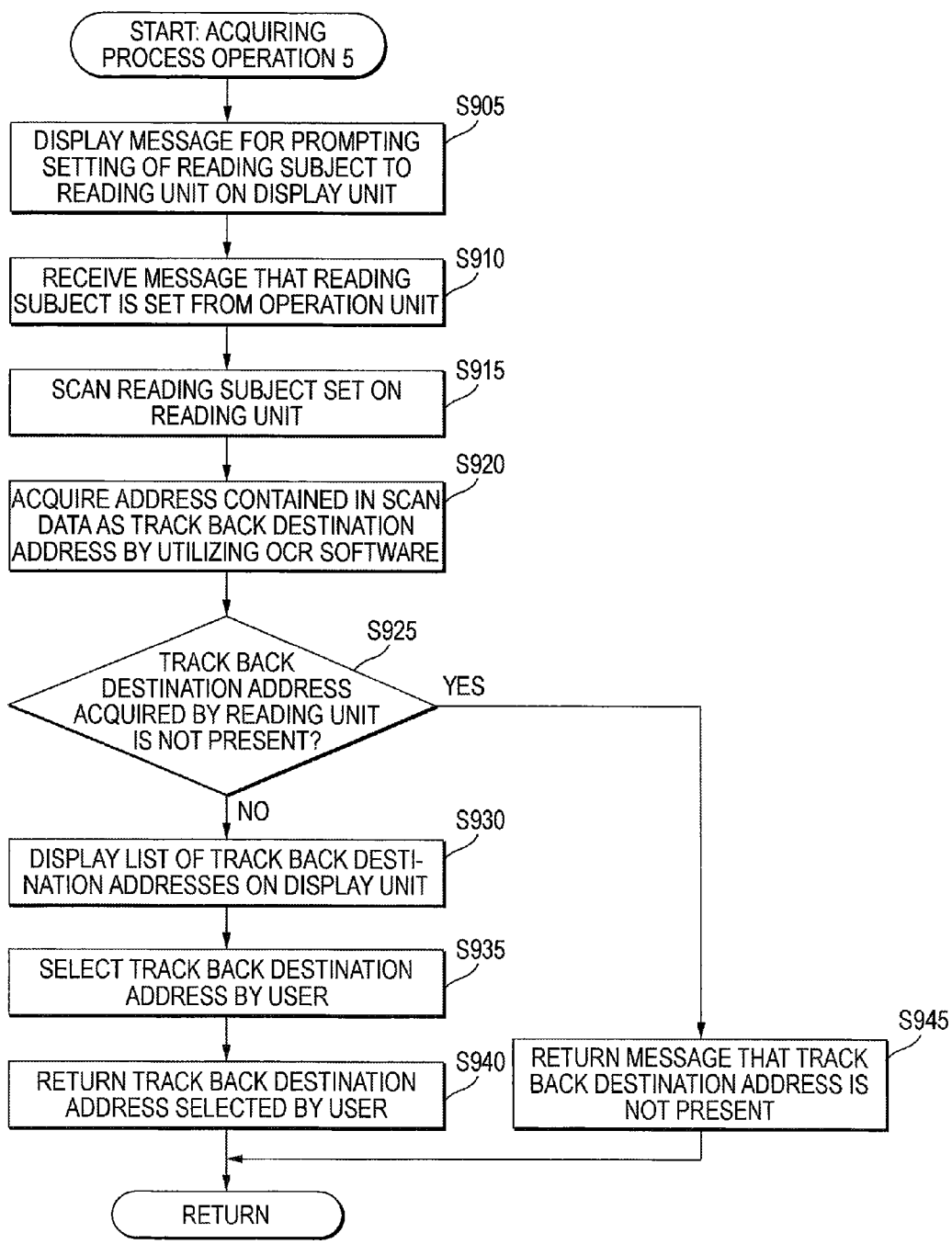
FIG. 16 is a flow chart for describing an acquisition process operation 5.

The fifth acquisition process operation corresponds to such a process operation in which a track back destination address is acquired from an image read by the reading unit 16. FIG. 16 is a flow chart for the fifth acquisition process operation.

When the process operation starts, as shown in FIG. 16, the multifunction device 1 first displays a message on the display unit 13, namely the message for prompting to set a read object (document) to the reading unit 16 (S905), and receives what indicates the read object having been set from the operation unit 12 (S910). In this case, the user can set the read object to the reading unit 16, and can perform an operation indicating the read object has been set.

When the user performs an operation for indicating the read object has been set, the multifunction device 1 scans the read object set to the reading unit 16 (S915), and acquires an address included in the scanned data as a track back destination address using OCR software (S920). An address expressed by one of, for example, characters, a bar code, a binary code, and the like, is recorded on the read object, and the OCR software in use corresponds to one of characters, a bar code, a binary code, and the like.

When the process operation of the step S920 is finished, the multifunction device 1 determines as to whether the track back destination address acquired from the reading unit 16 is not present or not (S925). When one track back destination address or two or more track back destination addresses are acquired from the reading unit 16 (S925: NO), the multifunction device 1 displays a list of the track back destination addresses on the display unit 13 (S930), and accepts a selection of a track back destination address by the user (S935).

Through the process operation of the step S930, the display unit 13 displays information as to one track back destination as shown in FIG. 9, as executed in the process operations of the steps S420, S625, S820. When information on multiple track back destinations is acquired from the reading unit 16, a triangular mark is displayed at the right end of the display unit 13, so that the user can display information on track back destinations on the display unit 13 one by one by making a key operation on the operation unit 12. In the process operation of the step S935, viewing the contents of the information, the user can arbitrarily select one track back destination address.

When the user selects one track back destination address in the process operation of the step S935, the user operates the operation unit 12 of the multifunction device 1 to return the selected track back destination address to the higher-rank process operation in which the fifth acquisition process operation was executed (track back destination address acquiring process operation shown in FIG. 7) (S940) after which the fifth acquisition process operation is accomplished.

When the decision in the process operation of S925 results in that there are no track back destination addresses acquired from the reading unit 16 (S925: YES), the multifunction device 1 returns the absence of a track back destination address to the higher-rank process operation in which the fifth acquisition process operation was executed (track back destination address acquiring process operation shown in FIG. 7) (S945) after which the fifth acquisition process operation is ended.

As a consequence of the fifth acquisition process operation, either one track back destination address is returned to, or no track back destination addresses are returned to, the track back destination address acquiring process operation shown in FIG. 7.

[Upload Process Operations]

Next, the detailed contents of the upload process operation (process operation of step S240 in FIG. 6) will be given.

Figure 17:
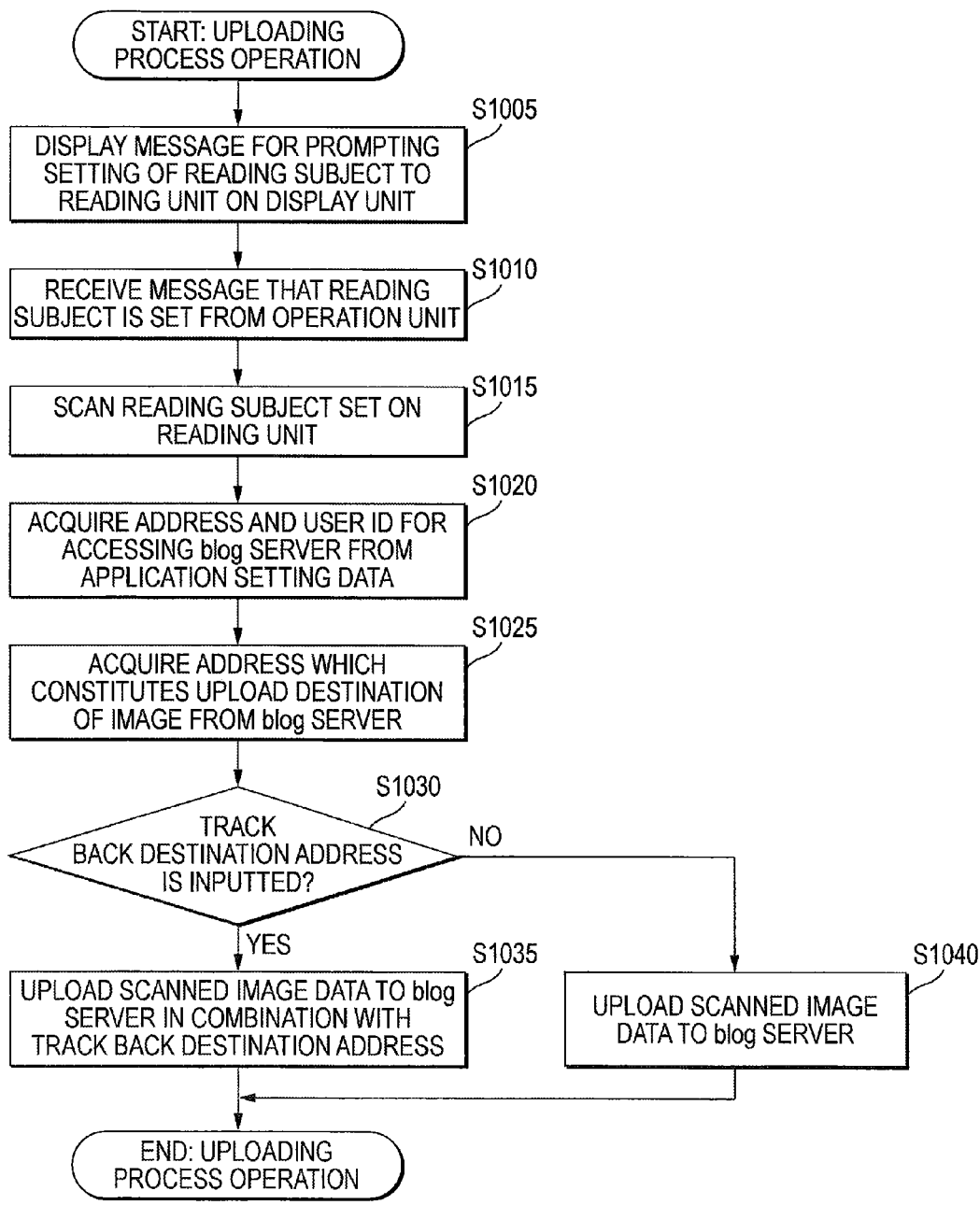
FIG. 17 is a flow chart for describing an uploading process operation.

FIG. 17 is a flow chart for the upload process operation.

When the process operation starts, as shown in FIG. 17, the multifunction device 1 first displays a message on the display unit 13, namely the message for prompting to set a read object (document) to the reading unit 16 (S1005), and receives what indicates the read object having been set from the operation unit 12 (S1010). In this case, the user can set the read object to the reading unit 16, and can perform an operation indicating the read object has been set.

When the user performs an operation indicating the read object has been set, the multifunction device 1 scans the read object set to the reading unit 16 (S1015). Then, the multifunction device 1 acquires an address and a user ID for accessing the blog server 2 from the application setting data 18a in the storage unit 18 (S1020), and accesses the blog server 2 so as to acquire an address where an image (article) is to be uploaded from the blog server 2 (S1025).

Subsequently, the multifunction device 1 determines as to whether a track back destination address is input or not (S1030). In the process operation of the step S1030, it is so determined that a track back destination address is input when a single track back destination address could be acquired in the process operation of the S220.

When the decision in the process operation of S1030 results in that the track back destination address has been input (S1030: YES), the image data (article) scanned by the reading unit 16 is uploaded, together with the track back destination address, to the blog server 2 (S1035) after which the upload process operation is ended.

When the decision in the process operation of S1030 results in that the track back destination address has not been input (S1030: NO), only the image data (article) scanned by the reading unit 16 is uploaded to the blog server 2 (S1040) after which the upload process operation is ended.

Figure 18:
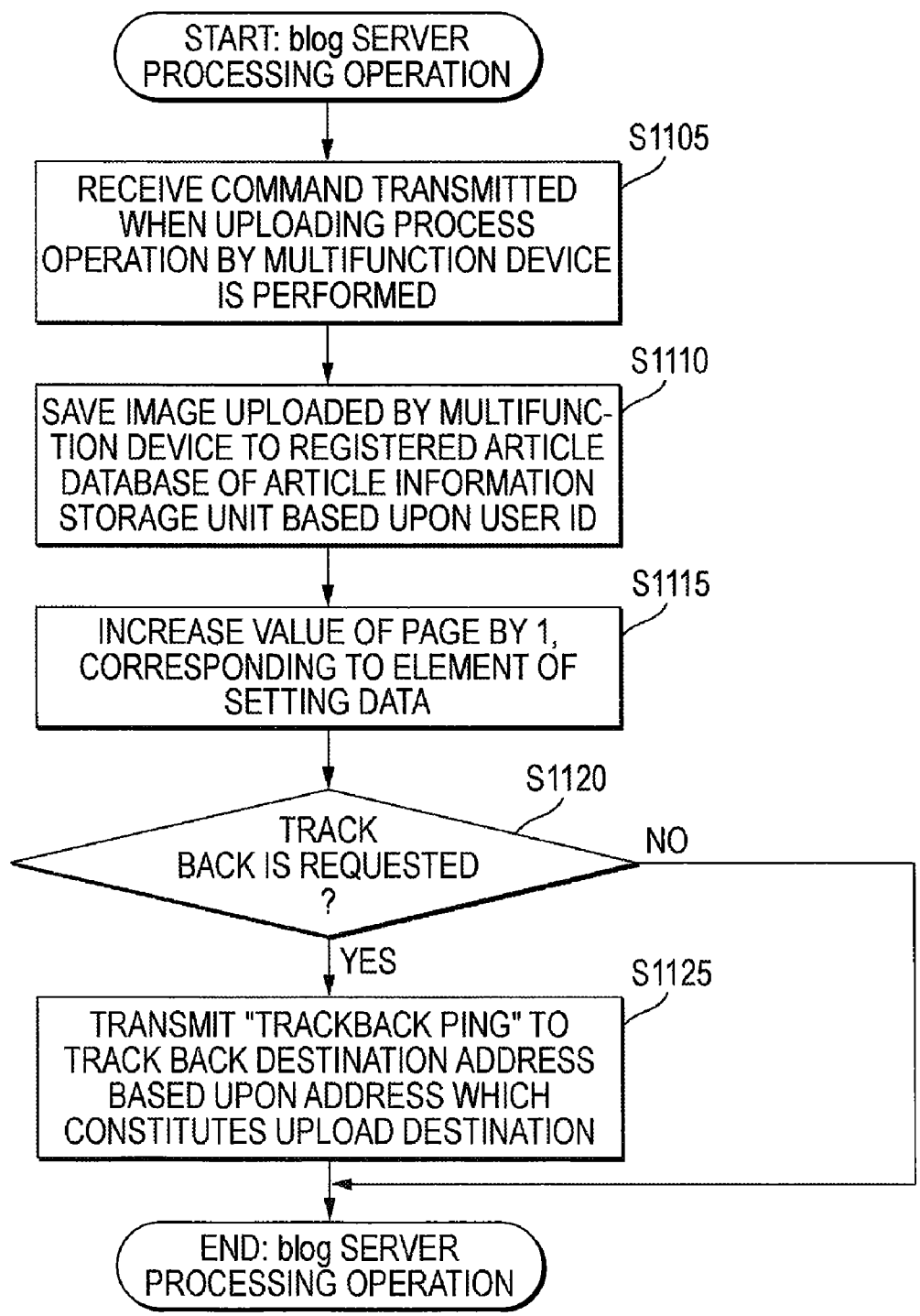
FIG. 18 is a flow chart for explaining a blog server processing operation executed on the side of the blog server.

When the above-described upload process operation is executed by the multifunction device 1, the blog server process operation is executed by the blog server 2. The following explanation will be made of the blog server process operation. FIG. 18 is a flow chart for the blog server process operation.

When the blog server process operation starts, the blog server 2 receives a command sent at the time of the upload process operation of the multifunction device 1 (data sent to blog server 2 from multifunction device 1 in steps S1035 or S1040) (S1105). Then, the image (article) uploaded by the multifunction device 1 is stored in the registered article database 23*b* of the article information storage unit 23 based on the user ID included in the received command (S1110).

Subsequently, the blog server 2 increments the value of "Page" which is an element in the setting data 23*a* by 1 (S1115). This makes it possible to save and manage an image (article) to be uploaded next in such a memory area as not to overwrite the uploaded image (article).

Next, the blog server 2 determines as to whether there is a request of a track back from the multifunction device 1 or not (S1120). If the multifunction device 1 is performing data transmission in the process operation of the step S1035 at the time of the upload process operation, then it is so determined that there is a request of a track back from the multifunction device 1 in the process operation of S1120, whereas if the multifunction device 1 is performing data transmission in the process operation of the step S1040 at the time of the upload process operation, then it is so determined that there is no request of a track back from the multifunction device 1 in the process operation of the step S1120.

When the decision in the process operation of the step S1120 results in that there is a request of a track back issued from the multifunction device 1 (S1120: YES), a track back ping (track back notification) is transmitted to the track back destination address based on the address to be an upload destination (S1125). By way of a concrete example, the address to be the upload destination for the image uploaded to the blog server 2 from the multifunction device 1 is assigned to the uploaded image, and is treated as the track back source address in the process operation of the step S1125. The data uploaded to the blog server 2 from the multifunction device 1 in the process operation of the step S1035 contains one track back destination address acquired in the process operation of the step S220. Using those track back source address track back destination address, the blog server 2 transmits a track back ping.

When the track back destination address is an address assigned to an article in the track back blog server 3, for example, the track back blog server 3 receives the track back ping transmitted in the process operation of the step S1125. With respect to an article corresponding to the track back destination address, the track back blog server 3 having received the track back ping additionally registers a hyperlink to the track back source address. Thereafter, when the track back blog server 3 receives a reading request on the article corresponding to the track back destination address, an article linked to the track back source address is distributed from the article information distributing unit 34. As a result, a terminal apparatus (e.g., PC 4) which has received the article can read the image uploaded to the blog server 2 by using the hyperlink to the track back source address described in the received article.

[Printed Article Registering Process Operations]

Next, the detailed contents of the printed article registering process operations (namely, process operation of step S125 shown in FIG. 5) will be explained.

Figure 19:
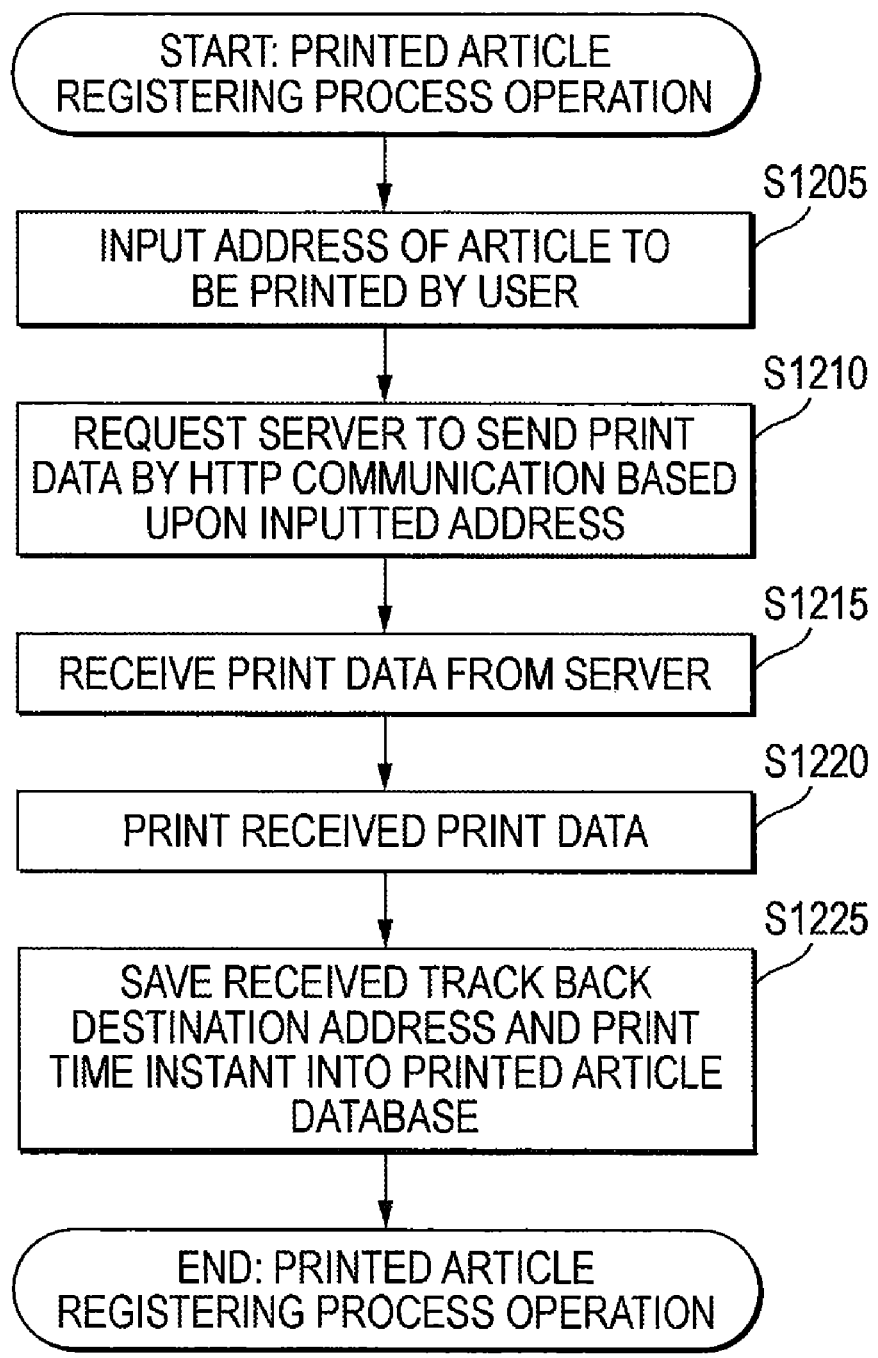
FIG. 19 is a flow chart for describing a printed article registering process operation.

FIG. 19 is a flow chart for explaining the printed article registering process operations.

When this process operation is commenced, as indicated in FIG. 19, the composite machine 1 first accepts an address input of an article which constitutes a print subject entered by the user (S1205), and requests the server to distribute print data (article) based upon the inputted address by way of an HTTP communication (S1210). It should be understood that the process operations defined in the steps S1205 and S1210 are equivalent to such process operations executed by a Web browser in a PC, and the print data required to be distributed with respect to the server in the above-explained process operation of the step S1210 corresponds to a print-purpose Web page.

Figure 20:
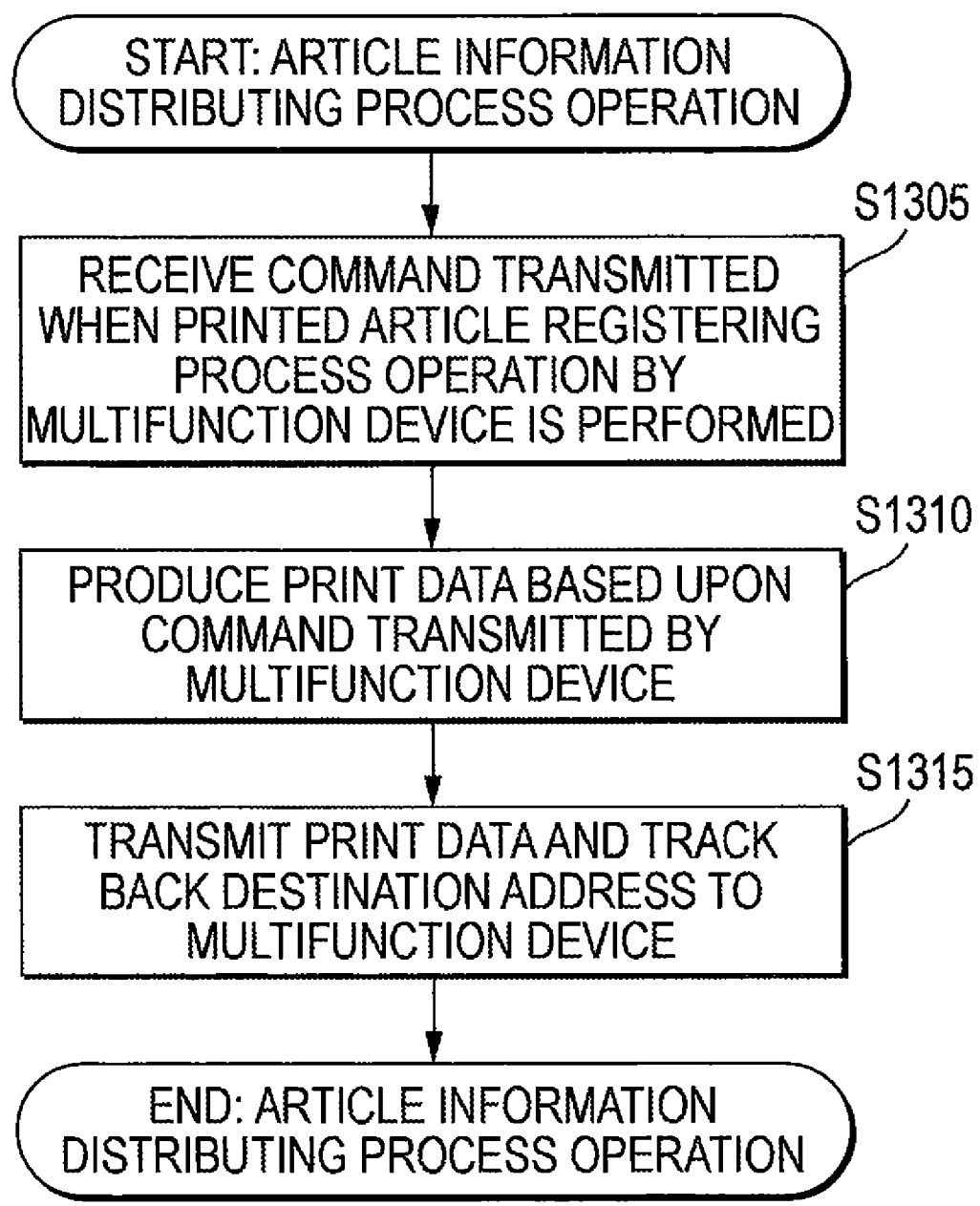
FIG. 20 is a flow chart for explaining an article information distributing process operation executed on the side of the track back destination server.

In this case, as to an article information distributing process operated executed on the server side which has received the request by the process operation of the step S1210, an explanation is made by exemplifying such a case of the track back destination blog server 3. FIG. 20 is a flow chart for describing the article information distributing process operation executed on the side of the track back destination blog server 3.

When the track back destination blog server 3 receives the request made by the process operation of the step S1210 from the multifunction device 1, as indicated in FIG. 20, the track back destination blog server 3 first receives a command transmitted when the printed article registering process operation by the multifunction device 1 is carried out (S1305) At this time, the received command corresponds to "command for requesting distribution of print data (article)" transmitted to the server in the process operation of the step S1210.

When this command is received, the track back destination blog server 3 produces print data based upon the command transmitted from the multifunction device 1 (S1310). In this process operation, print data is dynamically produced by combining static data whose content is not changed with such a dynamic data whose content is temporarily changed. Then, the track back destination blog server 3 transmits both the produced print data (article) and a track back destination address which corresponds to this produced print data to the multifunction device 1 (step S1315), and then the article information distributing process operation is accomplished.

As a result, since the above-explained article information distributing process operation is executed on the side of the track back destination blog server 3, both the print data (article) and the track back destination address are returned as an acknowledgement from the track back destination blog server 3. Referring back to the explanation as to the process operations executed on the side of the multifunction device 1, the printed article registering process operation shown in FIG. 19 will now be described.

If both the print data (article) and the track back destination address are returned as the acknowledgement from the track back destination blog server 3, then the multifunction device 1 receives the print data (article) from the track back destination blog server 3 (S1215), and prints the received print data (S1220). A predetermined article is printed out by executing this process operation, so that the user can view the printed article.

Then, the multifunction device 1 stores both the track back destination address received in combination with the print data and a printing time instant into the printed article database 18*b* provided in the storage unit 18 (S1225), and the printed article registering process operation is accomplished. Since this process operation is carried out, both the track back destination address corresponding to the printed article and the printing time instant are saved and stored in such a data format as shown in FIG. 2(*b*). It should be noted that the stored track back destination address is viewed and utilized in the previously explained acquisition process operation 1, and the like.

[Data Processing Operations in Memory Card]

Next, the detailed contents of the data processing operations (namely, process operation of step S135 shown in FIG. 5) executed within the memory card 6 will be explained.

Figure 21:
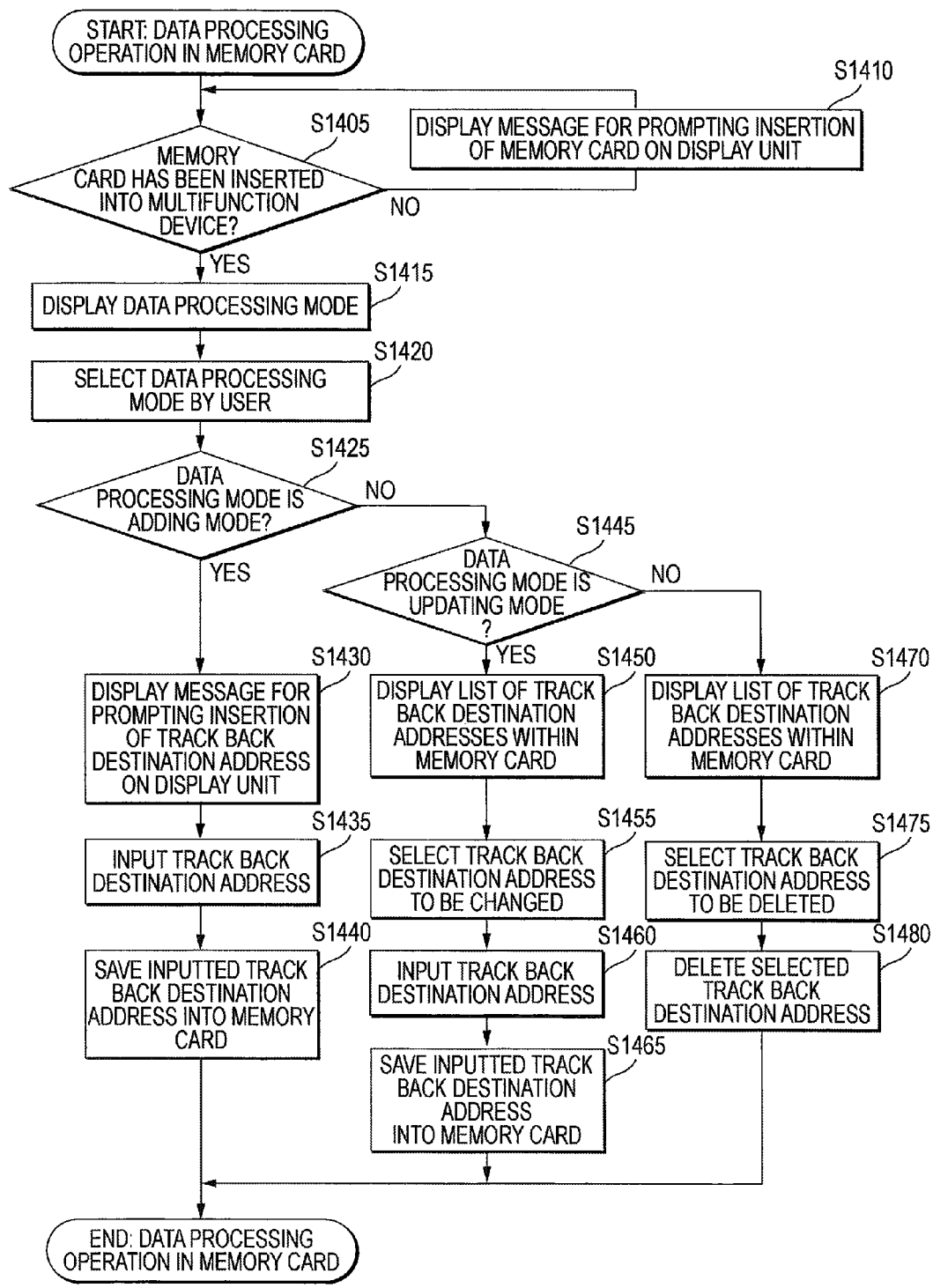
FIG. 21 is a flow chart for explaining a data processing operation executed in a memory card.

FIG. 21 is a flow chart for describing the data process operation executed in the memory card 6.

When this data process operation is commenced, as indicated in FIG. 21, the multifunction device 1 determines as to whether or not the memory card 6 has been inserted into the multifunction device 1 (S1405). When the memory card 6 has not been inserted into the multifunction device 1 ("NO" in step S405), the multifunction device 1 displays such a message for prompting an insertion of the memory card 6 on the display unit 13 (S1410), and the process operation is returned to the process operation defined in the step S1405.

On the other hand, when the memory card 6 has been inserted in the memory card 6 ("YES" in step S1405), the multifunction device 1 displays a data processing mode on the display unit 13 (S1415), and accepts a selection of a data processing mode made by the user by operating the operation unit 12 (S1420). As this data processing mode, three different processing modes are prepared, namely, an adding process mode, an updating process mode, and a deleting process mode. Any one of these three processing modes is selected by executing the process operation of the step S1420.

As a consequence, the multifunction device 1 first determines as to whether or not the selected data processing mode corresponds to the adding process mode (S1425), and if the adding process mode is selected ("YES" in step S1425), then the multifunction device 1 displays such a message for prompting that a new track back address is inserted on the display unit 13 (S1430). Then, the multifunction device 1 accepts an input of the new track back destination address by operating the operation unit 12 by the user (S1435). At this time, such a screen used to enter a track back destination address as shown in FIG. 11 is displayed on the display unit 13, and thus, the user may enter the track back destination address by way of a key operation on the operation unit 12. Then, the entered track back destination address is stored in the memory card 6 (S1440), and the data processing operation within the memory card 6 is accomplished.

On the other hand, when the data processing mode selected by the user is not the adding process mode ("NO" in step S1425), the multifunction device 1 determines as to whether or not the selected data processing mode corresponds to the updating process mode (S1445). When the updating process mode is selected ("YES" in step S1445), the multifunction device 1 displays a list of the track back destination addresses stored in the memory card 6 on the display unit 13 (S1450), and accepts a selection of a track back destination address which constitutes an address to be changed by the user (S1455).

Through the process operation of the step S1455, the display unit 13 displays information as to one track back destination as shown in FIG. 9. When information as to multiple track back destinations is extracted from the memory card 6, a triangular mark is displayed at the right end of the display unit 13, so that the user can display information on track back destinations on the display unit 13 one by one by making a key operation on the operation unit 12. In the process operation of the step S1455, viewing the contents of the information, the user can arbitrarily select one track back destination address.

Subsequently, the multifunction device 1 accepts an input of a track back destination address by operating the operation unit 12 by the user (S1460). At this time, such a screen used to enter a track back destination address as shown in FIG. 11 is displayed on the display unit 13, and thus, the user may enter the track back destination address by way of a key operation on the operation unit 12. Then, the entered track back destination address is stored in the memory card 6 (S1465), and the data processing operation within the memory card 6 is accomplished. In the process operation of the step S1465, the track back destination address entered in the process operation of the step S1460 is overwritten with respect to the track back destination address selected in the process operation of the step S1455 so as to be stored.

Then, as a result of the determining process operation in the step S1445, when the selected data processing mode is not the updating process mode ("NO" in step S1445), this fact implies that the data processing mode corresponds to the deleting process mode. As a result, the multifunction device 1 displays a list of the track back destination addresses stored in the memory card 6 on the display unit 13 (S1470), and accepts a selection of a track back destination address which may be deleted by the user (S1475).

Through the process operation of the step S1475, the display unit 13 displays information as to one track back destination as shown in FIG. 9. When information as to multiple track back destinations is acquired from the PC 4, a triangular mark is displayed at the right end of the display unit 13, so that the user can display information on track back destinations on the display unit 13 one by one by making a key operation on the operation unit 12. In the process operation of the step S1475, viewing the contents of the information, the user can arbitrarily select one track back destination address.

When the user selects one track back destination address, the multifunction device 1 deletes the selected track back destination address (S1480), and then, the data processing operation within the memory card 6 is accomplished.

[Advantage]

In accordance with the above-described multifunction device 1, in combination with the image read by the reading unit 16, such an address data indicative of the track back destination address corresponding to this read image can also be transmitted to the blog server 2. As a result, different from such an image processing apparatus that only the image read by the reading unit 16 is transmitted to the server (for instance, FTP server), since the process operation is carried out by only the multifunction device 1, the track back notification in which the image transmitted to the blog server 2 is used as the track back source can be transmitted from the blog server 2 to the track back destination address.

Also, while the track back is set with respect to the image uploaded to the blog server 2, the terminal apparatus such as the PC is no longer required to be utilized which is separately employed as the multifunction device 1. As a result, higher cost for conducting the entire system is not required since the terminal apparatus such as the PC is no longer required. Moreover, the multifunction device 1 and the terminal apparatus such as the PC are not required to be separately operated, so that the cumbersome operations can be omitted.

Also, in the above-explained multifunction device 1, while the access history (more concretely speaking, printed history as to articles printed by own appliance) of the Web pages to which the own appliance accessed in the past is saved in the printed article database 18*b*, the track back destination address can be selected from this access history. As a consequence, even when the operation unit 12 is equipped with only simple keys which are not proper to input the character strings, such a track back destination address which is constituted by a large number of characters can be entered in a very simple manner.

Furthermore, in the above-explained multifunction device 1, while the candidates as to the plural track back destination addresses are stored in the above-explained printed article database 18*b*, the user can arbitrarily select any one of these stored track back destination addresses. As a consequence, the possibility capable of accessing the track back destination address required by the user can be increased, as compared with that of such an appliance that only one latest access history is continuously stored in the overwriting manner.

Also, in the above-explained multifunction device 1, since the printed article database 18*b* has been stored in the storage unit 18 equipped in the multifunction device 1, the multifunction device 1 can access the printed article database 18 by executing only the internal process operation within the own appliance. As a consequence, even when trouble such as a communication failure happens to occur over a network, there is no possibility that the information cannot be acquired from the printed article database 18*b*, but also the track back destination address cannot be registered in the printed article database 18*b*.

In addition, in the above-explained multifunction device 1, the track back destination address can be simply acquired from the images (characters, bar codes, two-dimensional codes etc.) read by the reading unit 16, the memory card 6 detachably mounted on the multifunction device 1, or another terminal apparatus such as a PC. The user friendly recording medium may be employed as the acquisition destination of the track back destination address.

In the above-explained exemplary aspect, the multifunction device 1 corresponds to an image processing apparatus. Also, the blog server 2 to which the data is transmitted from the multifunction device 1 corresponds to such a server, namely "a server equipped with a function for distributing an image received from a terminal apparatus over a network to another terminal apparatus over the network, and another function for transmitting a track back notification with respect to a track back destination address."

Also, the reading unit 16 capable of reading an image from an original corresponds to an image reading unit. Also, the multifunction device 1 determines the track back destination address which should correspond to the image read by the reading unit 16 by executing the process operation of the step S220 (precisely speaking, process operations indicated in FIG. 7, FIG. 8, FIG. 10, FIG. 12, FIG. 15, and FIG. 16), and thus, the control unit 11 for executing this process operation of the step S220 corresponds to a determining unit. Also, the multifunction device 1 transmits the image data indicative of the image read by the reading unit 16 and the address data indicative of the track back destination address determined by the above-described determining unit to the blog server 2 by executing the process operation of the step S240 (precisely speaking, process operation shown in FIG. 17), and thus, the control unit 11 for executing this process operation of the step S240 corresponds to a data transmitting unit.

Furthermore, the multifunction device 1 converts the images (characters, barcodes, two-dimensional codes etc.) read by the reading unit 16 into data (track back destination addresses) represented by the images by executing the process operation of the step S920, and thus, the control unit 11 for executing this process operation of the step S920 corresponds to a data converting unit.

Also, the memory card 6 corresponds to a detachable storage medium. While the multifunction device 1 is equipped with the memory card interface 19 capable of reading the data which has been stored in this memory card 6, the multifunction device 1 reads the data stored in the memory card 6 by executing the process operation of the step S810, and thus, both the memory card interface 19 and the "control unit 11 for executing the process operation of the step S810" correspond to a data reading unit.

Also, while the multifunction device 1 is equipped with the communicating unit 14 capable of receiving the data (track back destination address) from the PC 4 capable of communicating with the own appliance, the multifunction device 1 receives the data from the PC 4 by executing the process operations of the steps S610 to S615, and thus, both the communicating unit 14 and the "control unit 11 for executing the process operations of the steps S610 to S615" correspond to a data receiving unit.

In addition, while the multifunction device 1 is equipped with the display unit 13 capable of displaying the list as to the plural track back destination addresses which constitute the address candidates to be processed, the multifunction device 1 displays the list on the display unit 13 by executing the process operations of the steps S420, S625, S820, or the process operation of the step S930, and thus, both the display unit 13 and the "control unit 11 for executing either the process operations of the steps S420, S625, S820, or the process operation of the step S930 correspond to an address list display unit. Also, while the multifunction device 1 is equipped with the operation unit 12 for accepting the input operation from the user, the multifunction device 1 selects at least one address from the list of the addresses displayed by the address list display unit based upon the input operation from the user accepted in the operation unit 12, and thus, the operation unit 12 and the "control unit 11 for executing either the process operations of the steps S425, S630, S825, or the process operation of the step S935" correspond to an address selecting unit.

[Other Exemplary Aspects]

While the exemplary aspects of the present invention have been described in the above explanations, the present invention is not limited only to the above-described concrete exemplary aspects, but may be embodied in other various modes.

For instance, in the above-described multifunction device 1, such an example that the printed article database 18*b* is stored in the storage unit 18 provided in the multifunction device 1 has been exemplified. Alternatively, an arrangement corresponding to the printed article database 18*b* may be provided in another appliance provided on the network 5.

More concretely speaking, for instance, in such a case that the user mainly uses the PC 4 so as to view the articles distributed from the blog server 2 and the track back destination blog server 3, a database equivalent to the above-described printed article database 18*b* may be alternatively provided within the PC 4, and a view history acquired in the PC 4 may be alternatively stored in this database. Otherwise, when an article is viewed on the PC 4, only in such a case that this article is printed out to the multifunction device 1, the print history may be alternatively stored in the database provided within the PC 4. If these arrangements are employed, then an access history (either view history or print history) may be alternatively stored in the database provided in the PC 4. In this case, the multifunction device 1 is communicated with the PC 4 at the same timing when the access history is acquired from the printed article database 18*b*, and the access history is acquired from the database on the side of the PC 4 by the PC 4. Then, the track back destination address may be selected from the access history acquired from the PC 4. If such an arrangement is employed, then the track back destination address may be selected based upon the access history stored in the PC 4 instead of the access history in the multifunction device 1.

Alternatively, while a shared storage device is provided on the network 5 and the shared storage device may be commonly accessed from the multifunction device 1 and a plurality of terminal apparatus provided on the network 5, which contain the PC 4, such a database equivalent to the printed article database 18*b* may be provided; and when the multifunction device 1 and the PC 4 receive a distribution of an article, all of these histories may be saved in the database within the shared storage device. In this alternative case, for instance, every time the multifunction device 1, the PC 4, or other terminals (for example, wireless terminal such as portable telephone) receives the distribution of the article, these appliances may access the database within the shared storage device so as to leave this history in the accessed database.

If the above-explained structures are employed, even when any of these structures is employed, the multifunction device 1 may select the track back destination addresses with reference to not only the access history of the own appliance, but also the access history of another appliance such as the PC 4. As a result, more user friendly structures may be arranged depending upon the user, or the use field.

What is claimed is:

1. An image processing apparatus comprising:
    an image reading unit configured to read an image from an original printed document;
    a determining unit that determines a track back destination address that is used in correspondence with the image read by the image reading unit;
    a data transmitting unit that transmits both image data indicative of the image read by the image reading unit, and address data indicative of the track back destination address determined by the determining unit via a network to a server that is equipped with a function for distributing an image received from a first information terminal over the network to a second information terminal over the network and a function for transmitting a track back notification corresponding to the track back destination address;
    an address list display unit that displays a list of track back destination addresses that constitute address candidates to be processed; and
    an address selecting unit that selects at least one address from the list of track back destination addresses displayed by the address list display unit based upon an input received from a user,
    wherein the determining unit determines the at least one address selected by the address selecting unit as the track back destination address that is used in correspondence with the image read by the image reading unit.

2. The image processing apparatus according to claim 1, wherein the determining unit determines the track back destination address which is used in correspondence with the image read by the image reading unit based upon a track back destination address corresponding to a Web page to which one of the first information terminal and the second information terminal accessed in the past.

3. The image processing apparatus according to claim 2, wherein the determining unit reads out the track back destination address corresponding to the Web page to which of the one of the first information terminal and the second information terminal accessed in the past from a database into which the track back destination address corresponding to the Web page is registered/stored by the one of the first information terminal and the second information terminal which accessed the Web page, and determines the track back destination address that is used in correspondence with the image read by the image reading unit based upon the read track back destination address.

4. The image processing apparatus according to claim 3, wherein the database is configured by utilizing a storage unit provided in the first information terminal.

5. The image processing apparatus according to claim 2, wherein the determining unit determines the track back destination address that is used in correspondence with the image read by the image reading unit based upon a track back destination address corresponding to a Web page that was printed by the first information terminal in the past.

6. The image processing apparatus according to claim 1, further comprising a data converting unit that converts the image read by the image reading unit into data that is represented by the read image,
    wherein the determining unit determines the track back destination address that is used in correspondence with the image read by the image reading unit based upon a track back destination address that is contained in the data converted by the data converting unit.

7. The image processing apparatus according to claim 1, further comprising a data reading unit configured to read data from a detachable storage medium into which the data has been stored,
    wherein the determining unit determines the track back destination address that is used in correspondence with the image read by the image reading unit based upon a track back destination address that is contained in the data read by the data reading unit.

8. The image processing apparatus according to claim 1, further comprising a data receiving unit configured to receive data from an information terminal configured to communicate with the first information terminal,
    wherein the determining unit determines the track back destination address that is used in correspondence with the image read by the image reading unit based upon a track back destination address that is contained in the data received by the data receiving unit.

9. The image processing apparatus according to claim 1, wherein the image processing apparatus integrally comprises the image reading unit, the determining unit and the data transmitting unit.

10. The image processing apparatus according to claim 9, wherein the image processing apparatus is a multifunction device.

11. A non-transitory computer readable medium having computer-executable instructions for enabling a computer configured in an image processing apparatus equipped with an image reading unit configured to read an image from an original printed document to perform predetermined operations, the predetermined operations including the steps of:

- determining a track back address that is used in correspondence with the image read by the image reading unit;
- transmitting both image data indicative of the image read by the image reading unit, and address data indicative of the track back destination address determined by the determining unit via a network to a server with a function for distributing an image received from a first information terminal over the network to a second information terminal over the network to a function for transmitting a track back notification corresponding to a track back destination address,
- displaying a list of track back destination addresses that constitute address candidates to be processed; and
- selecting at least one address from the list of track back destination addresses displayed based upon an input received from a user,
- wherein the determining includes determining the at least one address selected by the selecting as the track back destination address that is used in correspondence with the image read by the image reading unit.

12. The non-transitory computer readable medium according to claim 11, wherein the determining determines the track back destination address which is used in correspondence with the image read by the image reading unit based upon a track back destination address corresponding to a Web page to which one of the first information terminal and the second information terminal accessed in the past.

13. The non-transitory computer readable medium according to claim 12, wherein the determining determines the track back destination address that is used in correspondence with the image read by the image reading unit based upon a track back destination address corresponding to a Web page that was printed by the first information terminal in the past.

* * * * *